(12) United States Patent
Miller et al.

(10) Patent No.: US 9,511,448 B2
(45) Date of Patent: Dec. 6, 2016

(54) LASER MACHINING SYSTEM AND METHOD FOR MACHINING THREE-DIMENSIONAL OBJECTS FROM A PLURALITY OF DIRECTIONS

(71) Applicant: Resonetics, LLC, Nashua, NH (US)

(72) Inventors: Pascal Miller, Groton, MA (US); Sergey V. Broude, Newton Center, MA (US); David L. Wall, Burlington, MA (US); Kenneth Todd McDaniel, Merrimack, NH (US); David S. Holbrook, Lexington, MA (US)

(73) Assignee: RESONETICS, LLC, Nashua, NH (US)

( * ) Notice: Subject to any disclaimer, the term of this patent is extended or adjusted under 35 U.S.C. 154(b) by 0 days.

(21) Appl. No.: 14/822,048

(22) Filed: Aug. 10, 2015

(65) Prior Publication Data

US 2015/0343561 A1 Dec. 3, 2015

Related U.S. Application Data

(63) Continuation-in-part of application No. 13/520,089, filed as application No. PCT/US2010/062498 on Dec. 30, 2010, now Pat. No. 9,132,585.
(Continued)

(51) Int. Cl.
*B23K 26/03* (2006.01)
*B23K 26/04* (2014.01)
(Continued)

(52) U.S. Cl.
CPC ......... *B23K 26/032* (2013.01); *B23K 26/0084* (2013.01); *B23K 26/041* (2013.01);
(Continued)

(58) Field of Classification Search
CPC . B23K 26/032; B23K 26/041; B23K 26/0648; B23K 26/042; B23K 26/046; G02F 1/29
(Continued)

(56) References Cited

U.S. PATENT DOCUMENTS

| 4,767,909 A | 8/1988 | Okumoto |
| 4,952,770 A | 8/1990 | Hayashi |

(Continued)

FOREIGN PATENT DOCUMENTS

| DE | 10 2006 037922 A1 | 2/2008 |
| EP | 0 472 850 A2 | 3/1992 |

(Continued)

OTHER PUBLICATIONS

International Search Report of PCT/US2010/062498, date of mailing May 10, 2011.
(Continued)

*Primary Examiner* — Samuel M Heinrich
(74) *Attorney, Agent, or Firm* — Mintz Levin Cohn Ferris Glovsky and Popeo, P.C.

(57) ABSTRACT

A laser machining system for machining a work-piece includes a laser scanning head, external optical subsystems, and an image acquisition device. The external optical subsystems correspond to optical channels that include a first optical channel and a second optical channel. The laser scanning head controls an optical path so that a laser beam is directed and focused on the work-piece through the first optical channel and the second optical channel at different times. The first optical channel and the second optical channel correspond to respective specific portions of the work-piece to be machined by the laser beam. The image acquisition device is positioned to view the work-piece through the optical path. The image acquisition device acquires via the first optical channel one or more images of (Continued)

the work-piece to determine a displacement of the work-piece with reference to a best optical focus position of the second optical channel.

39 Claims, 12 Drawing Sheets

Related U.S. Application Data

(60) Provisional application No. 61/291,268, filed on Dec. 30, 2009.

(51) Int. Cl.
*B23K 26/06* (2014.01)
*B23K 26/00* (2014.01)
*B23K 26/36* (2014.01)
*G02F 1/29* (2006.01)

(52) U.S. Cl.
CPC .......... *B23K 26/042* (2015.10); *B23K 26/046* (2013.01); *B23K 26/0648* (2013.01); *B23K 26/082* (2015.10); *B23K 26/362* (2013.01); *B23K 2203/50* (2015.10); *G02F 1/29* (2013.01)

(58) Field of Classification Search
USPC ............ 219/121.61, 121.62, 121.68, 121.69, 219/121.83; 250/559.07
See application file for complete search history.

(56) References Cited

U.S. PATENT DOCUMENTS

| | | | |
|---|---|---|---|
| 5,315,604 A | 5/1994 | Chiu et al. | |
| 6,078,704 A * | 6/2000 | Bischel | G02F 1/011 385/10 |
| 6,285,488 B1 * | 9/2001 | Sandstrom | B23K 26/032 250/492.1 |
| 6,342,981 B1 | 1/2002 | Stiens et al. | |
| 7,449,659 B2 | 11/2008 | Kettner-Reich | |
| 2003/0037546 A1 | 2/2003 | Kapich | |
| 2004/0262274 A1 | 12/2004 | Patel | |
| 2006/0196858 A1 * | 9/2006 | Barron | A44C 17/00 219/121.69 |
| 2008/0035616 A1 | 2/2008 | Muller et al. | |
| 2008/0179301 A1 * | 7/2008 | Garty | C40B 60/12 219/121.69 |
| 2008/0269557 A1 * | 10/2008 | Marescaux | A61B 1/018 600/106 |

FOREIGN PATENT DOCUMENTS

| | | |
|---|---|---|
| EP | 0 472 850 A3 | 3/1992 |
| EP | 1 886 826 A2 | 2/2008 |
| EP | 1 886 826 A3 | 2/2008 |
| WO | WO 2009/117700 A2 | 9/2009 |
| WO | WO 2009/117700 A3 | 9/2009 |

OTHER PUBLICATIONS

Written Opinion of International Searching Authority of International Application No. PCT/US2010/062498, date of mailing May 10, 2011.

* cited by examiner

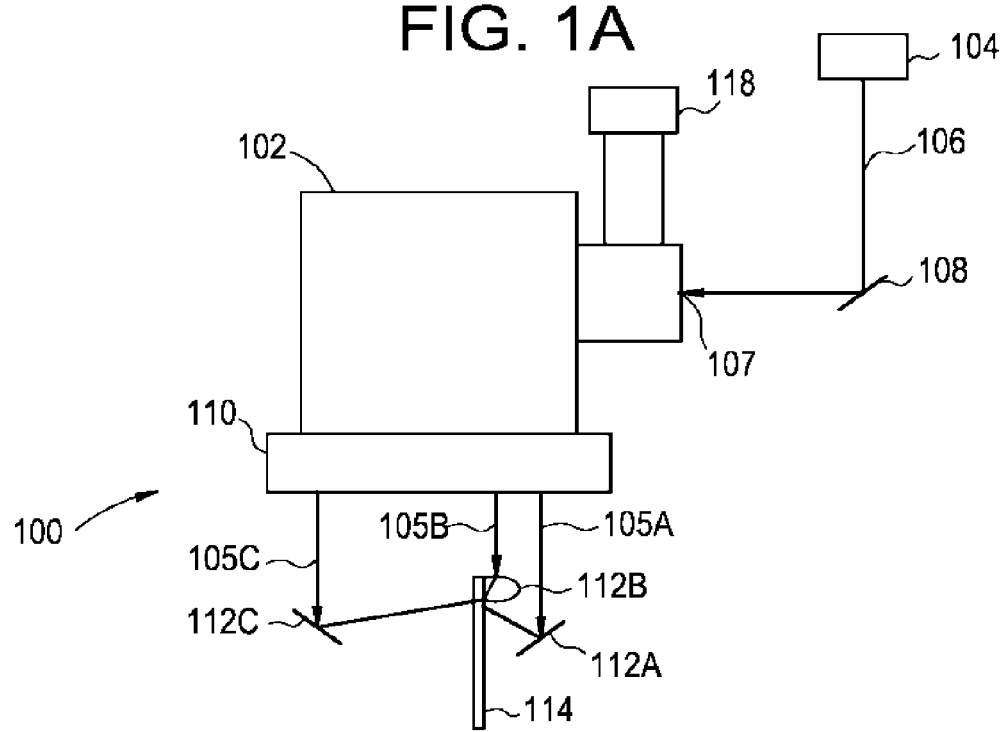
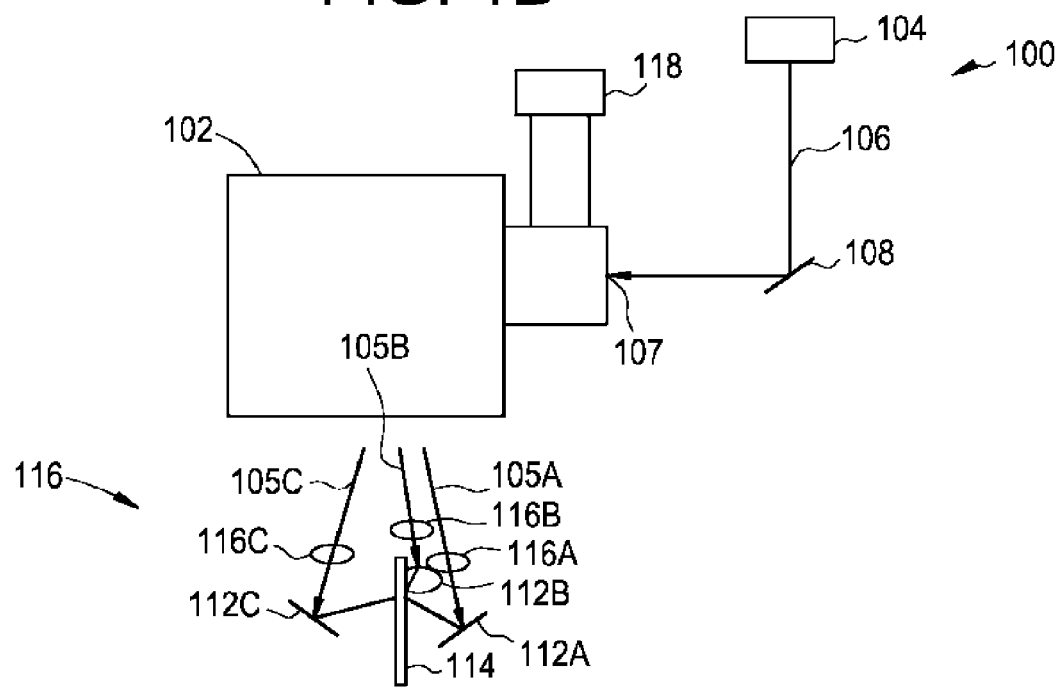

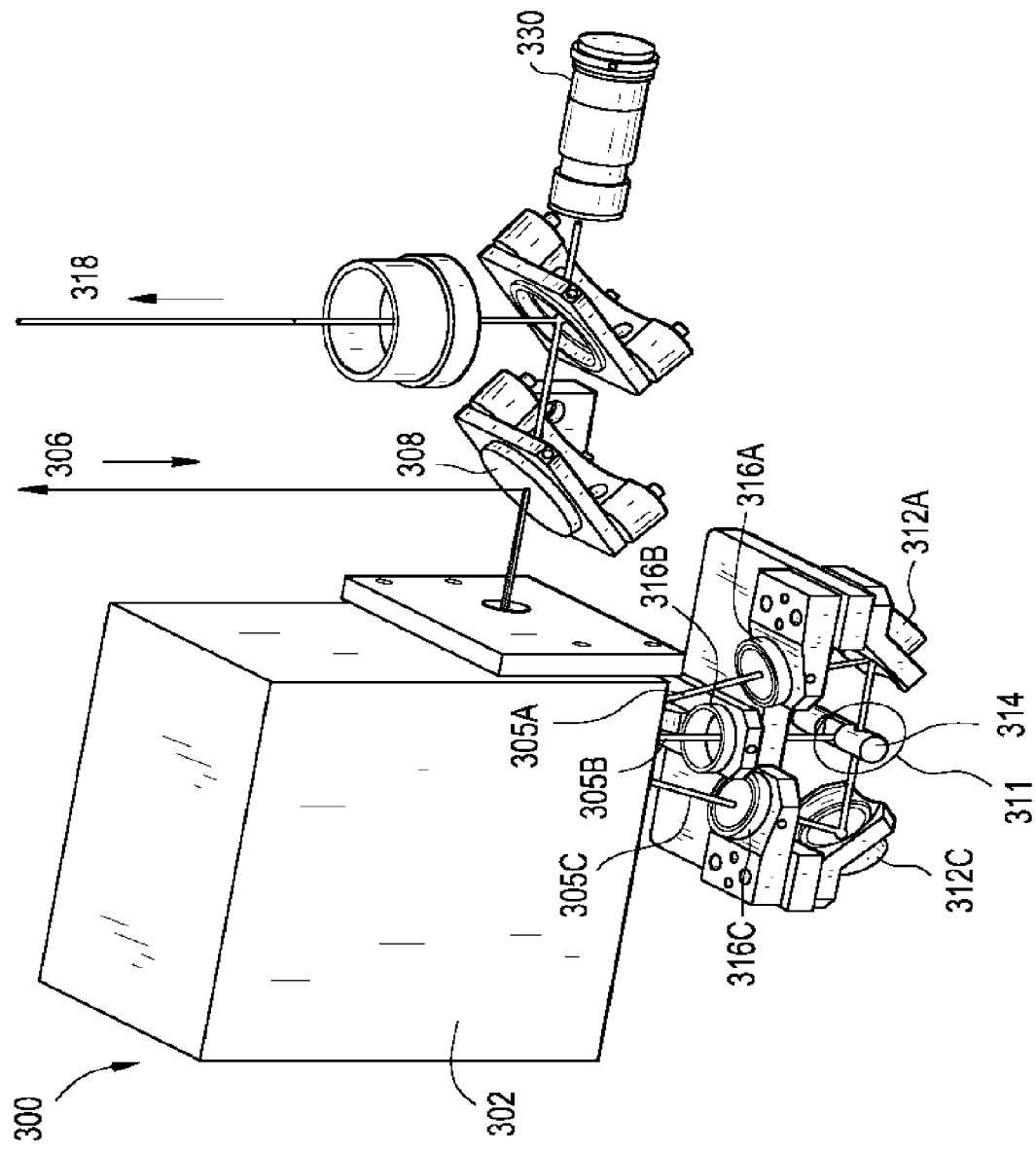

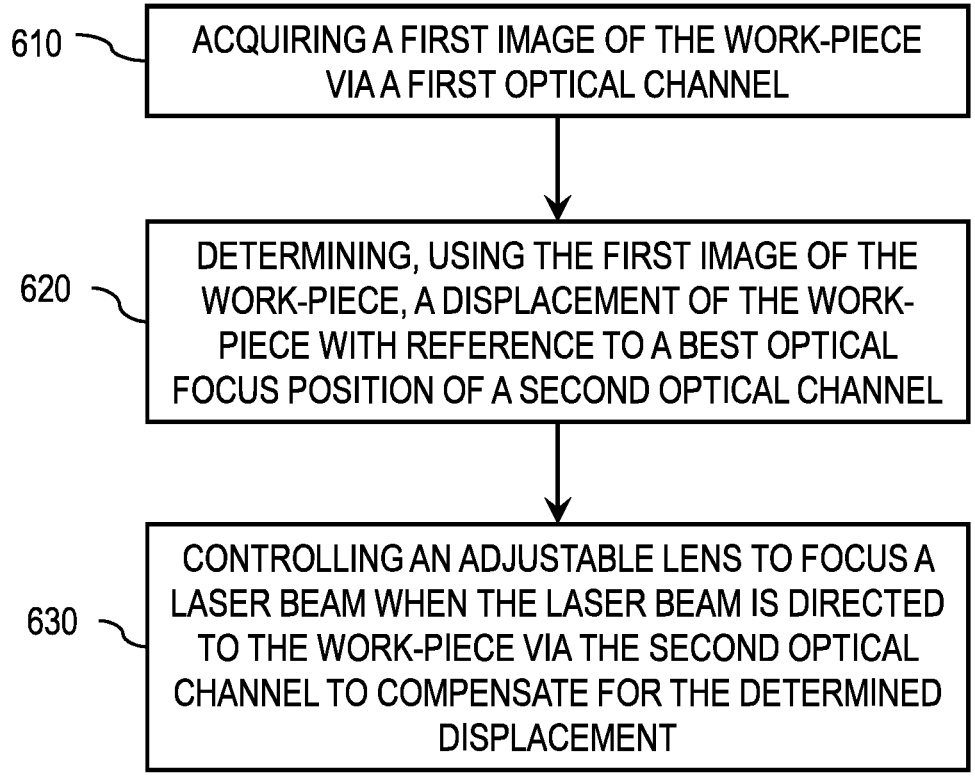

LASER MACHINING SYSTEM AND METHOD FOR MACHINING THREE-DIMENSIONAL OBJECTS FROM A PLURALITY OF DIRECTIONS

RELATED APPLICATIONS

This application is a continuation-in-part of U.S. patent application Ser. No. 13/520,089 filed Sep. 24, 2012, which is a national phase of International Application No. PCT/US2010/062498, filed on Dec. 30, 2010, which claims benefit under 35 USC §119(e) to U.S. provisional patent application No. 61/291,268, filed Dec. 30, 2009, entitled, "Laser Machining of Cylindrical, Conical or other 3D Objects from Different Directions". The contents of all of these applications are expressly incorporated herein by reference in their entireties.

FIELD OF THE DISCLOSURE

Embodiments of the present disclosure are directed generally to laser machining systems, devices and methods. Some embodiments of the disclosure are directed specifically to laser machining systems, devices and methods which can dynamically detect a work-piece position and adjust the laser focus.

BACKGROUND OF THE DISCLOSURE

Ablation is the removal of material from the surface of an object by vaporization, chipping, or other erosive processes. The term "ablation" is often used in the context of laser ablation (i.e., laser machining), a process in which a laser dissolves bonds in a solid or sometimes liquid material. As a result, small fragments of the material in the form of gases, small liquid and/or solid droplets or particles are freed from the material and either carried away by a gas stream or re-deposited on a nearby surface.

Common parameters of the ablation process include (i) laser beam wavelength, (ii) laser pulse duration and (iii) laser beam fluence. Laser beam wavelength is an important factor because ablation requires sufficient absorption of the laser light into the material. Absorption wavelength characteristics are material-specific. Laser pulse duration is also an important parameter, as the mechanisms of ablation can vary substantially depending on the pulse length. Common pulse regimes include ultra-short (10 s of fsec-10 psec), very short (10 psec-1 nsec), short (1-200 nsec), long (1 μsec-1 msec) and continuous-wave (CW). Laser beam fluence refers to the measure of energy per unit area and is usually measured in J/cm2. The higher the fluence, the more "cutting ability" a laser has. This parameter is particularly important because the laser beam fluence must exceed the specific threshold fluence value, $F_{th}$, of the target material for the laser to actually dissolve the molecular bonds and remove material. Laser beam fluence below the $F_{th}$ threshold value will increase a material's temperature, but will not melt or evaporate it. Threshold fluence values are material-specific, wavelength-specific and pulse duration-specific.

Laser ablation is thus greatly affected by the nature of the material and its ability to absorb energy, requiring that at the wavelength of the laser the material has sufficient absorption to enable ablation. The depth over which the laser energy is absorbed, and thus the amount of material removed by a single laser pulse, depends on the material's optical properties at the laser wavelength. Laser pulses can vary over a very wide range of durations (milliseconds to femtoseconds) and fluxes and can be precisely controlled.

Thus, laser ablation can be very valuable for both research and industrial applications. Laser ablation is often employed for precise material removal in the fabrication of advanced devices at the scale between microns and hundreds of microns and even at the scale of hundreds of centimeters, e.g., in case of solar panel fabrication. Both direct-write and mask-projection techniques are used, and laser wavelength is selected to be compatible with the materials being processed.

Common parameters of the laser drilling process include (i) laser wavelength, (ii) laser pulse energy, (iii) laser pulse duration, (iv) laser pulse repetition rate, (v) the number of laser pulses delivered, (vi) laser spot size and shape as delivered to the work-piece, (vii) laser energy density as delivered to the work-piece and (viii) the path and velocity of the scanning beam on the work-piece.

In laser machining, attaining high throughput for machining multiple parts corresponds to faster production, but more importantly, lower production cost, resulting in higher profits for a laser-machining organization. Thus, any improvement to throughput allows for a competitive advantage. This is true for either direct-write or mask projection machining.

Typically, to machine a three-dimensional object, either the object to be machined must be turned/rotated around one or more axes, the laser beam must be moved, and/or multiple laser beams must be used. This is so that all surfaces of the object requiring machining can be laser machined. In other words, either the work-piece or the output of the laser machining system must move (or be multiplexed in the case of multiple beams) so that all surfaces around the work-piece can receive laser treatment (e.g., 360 degrees).

In cases when the object to be machined must be turned/rotated around one or more axes, even with small objects, current systems utilize mechanical means. Such mechanical means are only capable of effecting the required movements with required precision and accuracy at limited speed, at the rate of approx. 0.3-3 sec per each movement. Often, additional time is required for settling vibrations caused by such motion. If the pattern to be machined consists of large number of features, the laser ablation process takes only a small fraction of the production time as compared to the time required for movement/motion of the object for machining for machining one feature at one location to another feature at another location, resulting in decreased efficiency (e.g., low duty cycle on laser usage). In addition, in situations where positioning registration by mechanical means does not provide adequate precision, other means such as machine vision alignment generally must be used. When multiple motions of the object are required, re-alignment after each motion adds time to the process cycle and further reduces the efficiency.

On the other hand, a galvanometer scanning approach enables the movement of a laser beam over comparable distances at the rate of 0.001-0.01 sec per each move, and times for settling of vibration for the galvanometer scanning head are significantly reduced as compared to the settling of vibrations due to rotation of the object for machining.

SUMMARY OF THE EMBODIMENTS

Accordingly, systems, devices and methods according to some embodiments of the present disclosure are provided for laser machining an object (which may also be referred to as a part or a work-piece, such terms may be used interchangeably throughout the subject disclosure) from a plurality of different orientations. Such objects for machining include, for example, cylindrical shaped objects (e.g., wire, tube, catheter, fibers), as well as other shaped objects.

The systems, devices and methods according to some embodiments of the disclosure utilize a two-dimensional optical scanner (e.g., galvanometer scanning head) and a laser beam (i.e., a laser). Accordingly, such embodiments enable the machining of the object from different directions without requiring:

rotation of the object,
multiple scanners for each direction,
and/or
without splitting or multiplexing the laser beam before the scanner.

To that end, the systems, devices and methods according to some embodiments of the present disclosure enable rapid machining of an object from different orientations, and may also enable rapid switching from one direction to another with no motion of the object. Such functionality, according to some embodiments, take advantage of the fact that it is easier to quickly control motion of a (relatively) light scanner mirror, than rotating a relatively heavy fixture associated (e.g., holding, handling) with the object/part being machined.

According to some embodiments, systems, devices and methods of the present disclosure can also enable machining a variety of features and shapes into an object, where the size and shape of laser machined features may be fully programmable (e.g., by software/controller of such a system).

According to some embodiments, systems, devices and methods of the present disclosure can also enable aligning, either manually or automatically, the laser beam for each orientation of the object.

In some embodiments, the laser may be a diode pumped solid state laser, and moreover, such a laser may include a fourth harmonic module designed (and optimized) to generate 2 W of UV power at 266 nm wavelength and at a repetition rate of 75 kHz (for example). Such a laser can produce a very short pulse width (e.g., less than 20 nanoseconds) and/or high peak power. The laser, according to some embodiments, may include at least one of an integrated power meter, high speed shutter and closed loop water chiller. In some embodiments, the laser can be any laser, pulsed or continuous wave (CW), producing a collimated beam with high enough energy and power to machine the object.

In some embodiments, beam delivery can be accomplished by first passing a linearly polarized beam produced by the laser through a quarter-wave plate to convert the beam into a circularly polarized beam to enhance the cut quality. In some embodiments, such a quarter-wave plate may not be necessary.

In some embodiments, one or more mirrors can steer/deflect a laser beam to the entrance of a galvanometer scan-head ("scan-head"). Moreover, in some embodiments, systems, methods and devices of the present disclosure may be equipped with a two-dimensional scan-head. For example, the scan-head in some embodiments can include two (2) mirrors mounted on galvanometer scanners, which can be controlled via high speed electronics. Accordingly, the scan-head may be capable of scanning the laser beam at high speed in a predefined pattern on the object, so as to effect the predefined pattern (e.g., features) onto/into the object by laser machining.

In some embodiments, following the scan-head, the laser beam can enter a flat-field (for example) scan lens. The scan lens focuses the laser beam down to a small spot. For example, a 2 mm diameter input laser beam can result in a laser beam spot size on a target of approximately 30 μm. In another example of some embodiments, the scan-head can have a large field size of, e.g., 45 mm×45 mm. In some embodiments, the scan-head is water cooled to achieve stable performance, using, for example, a closed loop water chiller.

In some embodiments, a system for machining a work-piece (e.g, a catheter) may include a scan-head including associated galvanometer scanning mirrors, three (3) small fixed mirrors, spaced approximately 120 degrees apart, each for deflecting the laser beam onto an area of the catheter corresponding to the 120 degree area with which a particular mirror is associated. Each small mirror can be used to machine one hole (as in some embodiments) in each respective area, a plurality of holes, or a particular pattern. In such a configuration (e.g., one hole in each area of the catheter to which a particular mirror corresponds), a single scan-head can sequentially machine all three holes around the catheter with minimum time between the machining of each hole. For example, each hole can be machined sequentially in a spiral-like pattern using motion of the scanner, with one of the three mirrors under the scan lens. Similar systems may include more than three (3) mirrors, which results in the spacing between each mirror being less (e.g., four (4) mirrors spaced apart approximately 90 degrees).

In some embodiments, it is not necessary to have all beams placed symmetrically (either with respect to each other or around the work-piece) and in some embodiments, it is not necessary for each beam to be "folded," that is, a folded beam arrives onto the work-piece/target via a mirror after exiting the galvanometer head, while a beam which is not folded arrives directly from the galvanometer (though via a field lens) onto the work-piece/target. For example, as shown in FIG. 3C, two beams are "folded" (i.e., via mirrors 312A and 312C) and arrive on the work-piece/target from two sides (e.g., 3 and 9 o'clock), while the third beam is not folded and arrives vertically onto the part (e.g., 12 o'clock). One of skill in the art will appreciate that in some embodiments of the present disclosure, other such configurations may be provided which utilize one or more or no folded beams.

One of skill in the art will appreciate that machining is not limited to producing one or more holes or small openings in/on an object, as any shaped feature can be machined by programming a controller of the scan-head to machine a particular feature. Such programming may be done via, e.g., a scanner controller, which may comprise a personal computer and/or microcontroller, and/or the like.

In some embodiments, a single common large field scan lens is used (as noted above), which focuses the beam for all three orientations (FIG. 1A or 2A), while in other embodiments, in place of (or in addition to) the large-field scan lens, three small-field lenses may be utilized and positioned before or after a respective mirror (one for each mirror), so that each lens may address only one beam direction (FIG. 1B or 3A) or area. In such an embodiment, each small lens is used only to focus the beam for one hole/pattern orientation. Accordingly, in some embodiments of the disclosure, each hole or pattern can be laser machined with a single scan-head and thus the laser beam need not be split or multiplexed before the scan-head.

In some embodiments, a gas assist nozzle can be mounted in close proximity to the machining system to supply a gas cooling jet onto the object during the laser machining process, to maintain machining quality. In some embodiments, the gas nozzle can be configured to provide gas flow on the object from a plurality of directions (e.g., three (3) directions). Moreover, in some embodiments, an exhaust port can be used to vacuum exhaust the ablation debris out of the machining system.

In some embodiments, a camera and corresponding adapter may be arranged at the entrance of the scan-head which may comprise a dichroic beam-splitter (which may be configured to transmit a UV beam and reflect visible light), a camera lens, and a camera. Such a camera adapter may be configured to enable observation of the machining of the object through the scan-head assembly. To that end, illuminators can be included to illuminate the object for adequate lighting to enable adequate pictures/video for the camera. In some embodiments, upon the scan-head switching an incoming beam from one mirror (e.g., folding mirror) to another, the camera can observe the processed part from the new direction at the same time. Accordingly, such embodiments may be part of a machine vision system to be included with the machining system to automatically align the scan-head with the object. Such features may be useful if the mechanical registration of the object with respect to the scan-head is not sufficient to achieve a required feature/hole/shape location with precision. For example, such a machine vision system can capture an image, digitize it (or the original image may be captured digitally), then analyze the digital image to automatically measure object location(s) relative to, for example, known features/positions of other structure of the system. The information retrieved for such object location(s) from the machine vision can then be used to correct any scanner offset for each hole/location (i.e., machined pattern). However, in some embodiments, use of the machine vision may impact throughput.

Some embodiments of the disclosure are directed to a laser machining system for machining a work-piece and may include a laser scanning head (e.g., scan-head, or galvanometer scan-head) including at least one first mirror to control output/movement of a laser beam, at least one scan-field lens for focusing the laser beam output from the scan head, and a plurality of second mirrors (preferably, in some embodiments, at least three) each for receiving the laser beam output from the scan lens and reflecting it upon a portion of the exterior of a work-piece for machining, each mirror defining a channel. In some embodiments, the at least one first mirror comprises two mirrors, together enabling deflection of the laser over a plane before exiting the scan-head. Moreover, in some embodiments, the at least one scan-field lens comprises a plurality of scan lenses each for a respective second mirror.

Some embodiments for a laser machining system according to the present disclosure may include one or more of the following:
- a camera for imaging the work-piece or a portion thereof (see, e.g., machine vision noted above);
- an illumination source (e.g., LED) for illuminating the work-piece for imaging by the camera (either direct onto work-piece or through the scanner);
- a laser;
- a controller (e.g., a computer, a micro-processor running application specific programs to control the laser machining system) for controlling any one or more components of any of the embodiments presented in the present disclosure;
- a quarter-wave plate for converting the laser beam into a circularly polarized beam;
- the at least one first mirrors are configured to be moved to effect movement of the laser along a line (in some embodiments) or in a plane (in some embodiments).
and the like.

In some embodiments, a method for laser machining a work-piece is provided and comprises at least one of the following steps, and preferably, several steps, and most preferably, all steps: providing a laser machining system according to any of the noted laser machining systems presented by the subject disclosure, positioning a work-piece for machining in a work-piece retaining area of the machining system, performing a spot laser check along at least one channel of the laser machining system, acquiring the work-piece location, and machining the work-piece by sequentially utilizing the components of each channel. Such a method may also further include inspecting, automatically, the machining of the work-piece along an area of the work-piece corresponding to at least one channel may be performed for at least one channel.

In some method embodiments of the present disclosure, spot laser checking for some laser machining embodiments may comprise deflecting the scanning head mirror to a corresponding nominal position for a first channel, firing a laser beam off the second mirror associated with the first channel at a first predetermined location, where the laser beam impinges upon the work-piece to generate an ablation plume, capturing an image of the plume, locating the plume on the work-piece, comparing the location of the plume to the first predetermined location, adjusting coordinates of the machining system as a result of the comparison, such that the first predetermined location corresponds to the location of the plume, and optionally repeating the spot laser check. Such laser spot checking may be performed for a plurality of channels of the system, or each channel of the system.

In some method embodiments of the present disclosure, acquiring work-piece location in some of the machining system embodiments may comprise deflecting at least one first mirror through a nominal position for a respective channel, activating at least one illumination source, imaging the work-piece with a camera to produce a first view of the work-piece for the respective channel, comparing a first stored location of the work-piece to the actual location of the work-piece from the image, updating coordinates for the work-piece in the laser machining system based on the comparison and optionally repeating the procedure for each channel.

In some method embodiments of the present disclosure, inspection of the machined work-piece for some of the laser machining system embodiments along a respective channel may comprise: deflecting the at least one first mirror of the scanning head to a nominal position relative to the respective channel, activating an illumination source to illuminate a portion of the work-piece corresponding to the area for which machining is accomplished by the respective channel, acquiring an image of the area of the work-piece machined along the respective channel, processing the acquired image to determine at least one of actual dimensions and actual location of machined features relative to the work-piece, determining a difference in at least one of the actual dimensions and actual location and machined features and comparing such to required dimensions and location of the machine features, and determining whether the difference is within a predetermined tolerance, rejecting the machined work-piece if the difference is outside of the predetermined tolerance, and repeating the inspection procedure for each respective channel.

In some method embodiments, the results obtained for any locations, inspections and the like may be logged, and such logging may optionally include associated parameters of the machining selected from the group consisting of (for example and not limited to): laser power, number of laser pulses, and laser pulse rate.

In some embodiments of the present disclosure, a system for laser machining a work-piece is provided and may include one or more of: a laser scanning head including at least one first mirror to control output of a laser beam in at least one direction (e.g., along a line, in a plane), at least one scan-field lens for focusing the laser beam output from the scan head, a plurality of second mirrors each for receiving the laser beam output from the scan lens and reflecting it upon a portion of the exterior of a work-piece for machining, each mirror defining a channel, a laser for producing a laser beam to enable machining of the work-piece, positioning means for positioning a work-piece for machining in work-piece retaining area, spot laser checking means for performing spot laser checks along at least one channel of the laser machining system, and work-piece location acquisition means for acquiring an actual location of the work-piece in the laser machining system. Such system embodiments may also include work-piece inspection means for inspecting the resulting machining performed on the work-piece. In some such embodiments, a camera is provided for capturing at least one image of the work-piece, the camera comprising at least a portion of one or more of the positioning means, laser spot checking means and work-piece inspection means.

In some embodiments of the present disclosure, a laser machining system for machining a work-piece includes a laser scanning head, external optical subsystems, and an image acquisition device. The external optical subsystems correspond to optical channels that include a first optical channel and a second optical channel. The laser scanning head controls an optical path so that a laser beam is directed and focused on the work-piece through the first optical channel and the second optical channel at different times. The first optical channel and the second optical channel correspond to respective specific portions of the work-piece to be machined by the laser beam. The image acquisition device is positioned to view the work-piece through the optical path. The image acquisition device acquires via the first optical channel one or more images of the work-piece to determine a displacement of the work-piece with reference to a best optical focus position of the second optical channel.

In some embodiments of the present disclosure, the image acquisition device can acquire one or more images via the second optical channel to determine a location of the work-piece with reference to a best optical focus position of the first optical channel. The optical channels can include three or more optical channels. The image acquisition device can acquire via one or more of the three or more optical channels one or more images of the work-piece to determine a location of the work-piece with reference to a best focus position of another of the three or more optical channels.

In some embodiments of the present disclosure, the laser machining system can include an adjustable lens positioned in the optical path and a controller. The controller can compute a displacement of the work-piece with reference to the best optical focus position of the second optical channel using the position of the work-piece with reference to the second optical channel and cause adjustment of the adjustable lens to focus the laser beam on the work-piece when the laser beam is directed to the work-piece via the second optical channel. The controller can compute a displacement of the work-piece with reference to the best optical focus position of the first optical channel using the position of the work-piece with reference to the first optical channel and cause adjustment of an adjustable lens to focus the laser beam on the work-piece when the laser beam is directed to the work-piece via the first optical channel. The one or more images acquired via the first optical channel can be used to determine a lateral displacement of the work-piece with reference to the first optical channel. The one or more images acquired via the second optical channel can be used to determine a lateral displacement of the work-piece with reference to the second optical channel.

The laser machining system can include a scanning mirror positioned in the optical path and a controller. The controller can compute a lateral displacement for the first optical channel using the position of the work-piece with reference to the first optical channel and cause the scanning mirror to adjust the laser beam direction when the laser beam is directed through the first optical channel to compensate for a lateral displacement of the work-piece. The controller can compute a lateral displacement for the second optical channel using the position of the work-piece with reference to the second optical channel and cause the scanning mirror to adjust the laser beam direction when the laser beam is directed through the second optical channel to compensate for the lateral displacement of the work-piece.

In some embodiments of the present disclosure, the first optical channel and the second optical channel can provide substantially orthogonal views of the work-piece. The image acquisition device can acquire images during laser machining of the work-piece to dynamically measure, using images acquired via the first optical channel, the position of the work-piece with reference to the second optical channel. An illumination source can be included for illuminating the work-piece for imaging by the image acquisition device. A laser and a controller can be included. The controller can control at least one of the scanning head, components of the scanning head, image acquisition device, and the laser.

In some embodiments of the present disclosure, the optical subsystems can each receive separately and at different times the laser beam from the laser scanning head, and each of the optical subsystems can include a lens to focus the laser beam.

In some embodiments of the present disclosure, a first image can be acquired of the work-piece by an image acquisition device and via a first optical channel. The image acquisition device forms part of a system further comprising a laser scanning head, an adjustable lens, and external optical subsystems corresponding to optical channels comprising the first optical channel and a second optical channel. The laser scanning head controls an optical path so that a laser beam passes at different times through the first optical channel and the second optical channel. The first optical channel and the second optical channel correspond to respective specific portions of the work-piece to be machined by the laser beam. Using the first image of the work-piece, a displacement of the work-piece with reference to a best optical focus position of the second optical channel is determined. The adjustable lens is controlled to focus the laser beam on the work-piece when the laser beam is directed to the work-piece via the second optical channel to compensate for the determined displacement.

In some embodiments of the present disclosure, a second image can be acquired of the work-piece by the image acquisition device via the second optical channel. Using the second image of the work-piece, a displacement of the work-piece with reference to a best optical focus position of the first optical channel can be determined. The adjustable lens can be controlled to focus the laser beam on the work-piece when the laser beam is directed to the work-piece via the first optical channel to compensate for the determined displacement.

In some embodiments of the present disclosure, using the first image acquired via the first optical channel, a lateral displacement of the work-piece with reference to the first optical channel can be determined. A scanning mirror can be controlled to adjust the laser beam direction when the laser beam is directed through the first optical channel to compensate for the determined lateral displacement of the work-piece. Using the second image acquired via the second optical channel, a lateral displacement of the work-piece with reference to the second optical channel can be determined. The scanning mirror can be controlled to adjust the laser beam direction when the laser beam is directed through the second optical channel to compensate for the determined lateral displacement of the work-piece.

In some embodiments of the present disclosure, the first optical channel and the second optical channel can provide substantially orthogonal views of the work-piece. Using images acquired via the first optical channel and during a period of time of laser machining of the work-piece, the displacement of the work-piece with reference to the best optical focus position of the second optical channel can be dynamically determined.

In some embodiments of the present disclosure, using an illumination source, the work-piece can be illuminated for imaging by the image acquisition device. The system can include a laser and a controller. The controller can control at least one of the scanning-head, components of the scanning-head, the image acquisition device, and the laser. The external optical subsystems can each receive separately and at different times the laser beam from the laser scanning head, and each of the external optical subsystems can include a lens to focus the laser beam.

In some embodiments of the present disclosure, a laser machining system for machining a work-piece includes a laser scanning head, external optical subsystems, and an image acquisition device. The external optical subsystems correspond to optical channels including two or more optical channels. The laser scanning head controls an optical path so that a laser beam passes at different times through each of the two or more optical channels. Each of the two or more optical channels corresponds to a respective specific portion of the work-piece to be machined by the laser beam. The image acquisition device is positioned to view the work-piece through the optical path. The image acquisition device acquires via two or more of the two or more optical channels two or more images of the work-piece to measure a position of the work-piece with reference to one of the two or more optical channels.

In some embodiments of the present disclosure, a method for laser machining a work-piece includes acquiring one or more images of the work-piece by an image acquisition device and via each of two or more optical channels. The image acquisition device forms part of a system including a laser scanning head, an adjustable lens, and external optical subsystems corresponding to optical channels comprising the two or more optical channels. The laser scanning head controls an optical path so that a laser beam passes at different times through each of the two or more optical channels. Each of the two or more optical channels corresponds respectively to specific portions of the work-piece to be machined by the laser beam. Using the one or more images of the work-piece, a position of the work-piece is determined with reference to one of the two or more optical channels. The adjustable lens is controlled to focus the laser beam when the laser beam is directed to the work-piece via the second optical channel to compensate for the determined position.

Further embodiments and objects thereof for the present disclosure will become clearer with reference to figures provided with the subject disclosure, which include drawings of exemplary embodiments of the disclosure; a brief description thereof is set out below, as well as reference to the forthcoming detailed description.

BRIEF DESCRIPTION OF THE FIGURES

FIG. 1A illustrates a laser machining system for machining an object from multiple directions according to some embodiments of the present disclosure.

FIG. 1B illustrates another laser machining system for machining an object from multiple directions according to some embodiments of the present disclosure.

FIG. 3C illustrates a partial exploded perspective view of a laser machining system according to some embodiments of the present disclosure, which utilizes a pair of folded beams, and a single unfolded beam, for example.

FIG. 6 is a process flow diagram illustrating another example process for laser machining a work-piece to compensate for the position of the work-piece and using the laser machining system of FIG. 5.

DETAILED DESCRIPTION OF THE EMBODIMENTS

Embodiments of the present disclosure are directed to systems, devices, and methods for improved laser machining of work-pieces, by directing a laser beam at a work-piece from different directions without requiring a plurality of beams, and without requiring rotation of the work-piece.

In some embodiments, the current subject matter can dynamically detect the work-piece position for each of several optical channels and dynamically adjust the focus for each of the channels. Detection of work-piece position can aid in machining if: (a) the work-piece is moving or bent, or not consistently positioned in the laser beams; and/or (b) if the laser depth of focus is too shallow to accommodate for these focus variations.

Figure 2A:
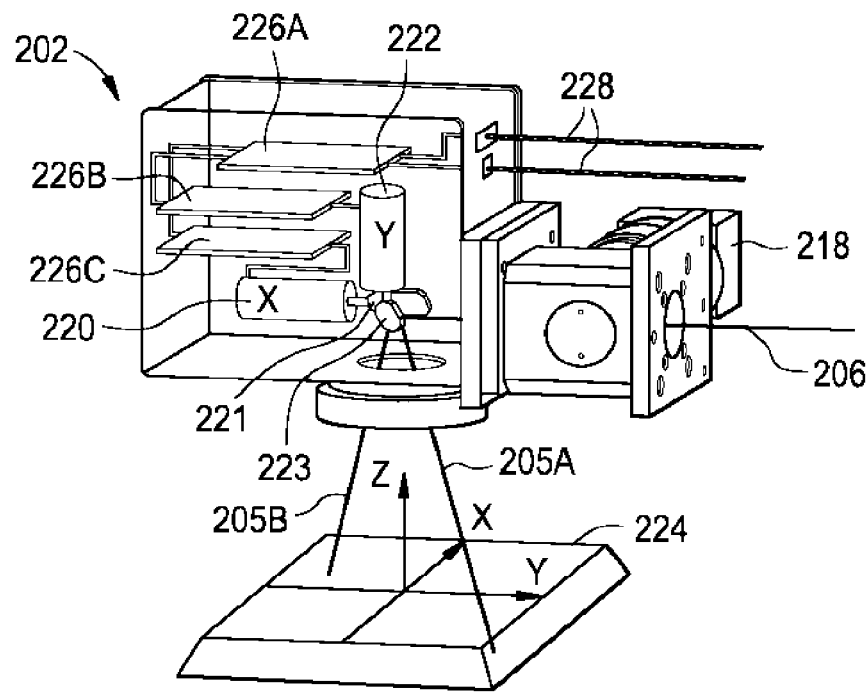
FIG. 2A illustrates a perspective view of a cut-away of a galvanometer scanning head unit for a laser machining system

It is noted that similar structure in different figures is denoted by a similar reference numeral, with only the first digit of the number changing depending upon the figure number (i.e., item 102 in FIGS. 1A and 1B, correspond to item 202 in FIG. 2A).

Accordingly, in some embodiments, a system for machining a work-piece (e.g., a catheter, cylinder, or other shape or object) is provided and may include a galvanometer scanning-head unit (as noted earlier, "scan-head") having at least one mirror (galvanometer scanning mirror) configured to deflect the laser beam (e.g., along a line, or, in a plane), and preferably including two such mirrors, each for deflecting the laser beam in at least one plane (e.g., X-Y plane). The system may also include a plurality of individual secondary mirrors, which are preferably fixed (though may be foldable), and spaced apart from one another, and used to direct the laser beam output from the scan-head onto certain predetermined areas/portions of the work-piece to be machined (e.g., for a folded beam). For example, in some such embodiments, three such secondary mirrors are provided and are spaced apart from one another by approximately 120 degrees. Thus, each mirror can direct the laser beam output from the scan-head onto one-third (⅓) of the surface area of the work-piece for machining.

FIGS. 1A and 1B are block diagrams which illustrate exemplary embodiments of such a laser machining system briefly described above. As shown, exemplary system 100 includes scan-head 102, which includes, for example, at least one scanning galvanometer mirror, not shown, configured to move a laser beam along in at least one dimension (e.g., a line or in a plane; as noted above, preferably, two such galvanometer scanning mirrors, to enable movement in, for example, an X-Y plane), a laser 104 which produces a laser beam 106 to be received by the scan-head 102 and processed thereby via the mirror(s), an optional first mirror and/or beam splitter 108 to direct the laser beam (or a portion of the laser beam) into the scan-head 102. Alternatively, the machining system may do away with first mirror/splitter 108 upon the laser beam axis corresponding directly to the beam entrance 107 to the scan-head. The system may further include a field scan lens 110, a plurality of (i.e., two or more) second mirrors 112 (112A, 112B and 112C) for directing the beam emanating from the scan-head 102 onto work-piece 114 for machining. The scan-head/galvanometer mirror(s) move to direct/deflect the laser beam from one location to another (and in some embodiments, in rapid fashion) received by the scan-head onto each of the plurality of second mirrors 112. Accordingly, each second mirror may be used to direct the laser beam output from the scan-head onto a specific portion/area of the work-piece to machine a predetermined pattern or feature (e.g., a hole) thereon, and thus, enable a single scan-head to machine the complete surface of the work-piece for machining without movement of the work-piece (for example). Each mirror may comprise a "channel" for the machining a specific corresponding area of the work-piece to be machined. In some embodiments, and preferably, multiple channels are provided so that the single scan-head can then sequentially machine features into/onto the entire surface area of the work-piece, at any location around the work-piece, with minimal time between each specific portion, by simply directing the laser to each channel. Thus, movement of the laser beam by the scan-head may be in a spiral-like pattern, for example, to enable the machining of the work-piece at different locations anywhere around the work-piece using different second mirrors (e.g., different channels) after the field lens.

In some embodiments, as shown in FIG. 1B, such a system may further include, in addition to or in place of the large field lens 110, a plurality of smaller (e.g., secondary) lenses 116 (116A, 116B, 116C), one each (for example) for the secondary mirrors 112, which may be positioned either before or after a respective mirror, so that each lens, according to particular embodiments, may be used to focus the beam in only one direction/channel. In that regard, each smaller lens may be used only to focus the beam for those features to be machined on the work-piece, which corresponds to the portion of the work-piece for which the mirror/lens combination is configured to machine. Accordingly, a pattern or feature(s) can be laser machined on/into the work-piece using only a single scan-head without movement of the work-piece, and moreover, in some embodiments, the beam need not be split or multiplexed before the scan-head (i.e., there is only one laser beam used to machine the work-piece). Additionally, as shown in FIGS. 1A and 1B, the machining system may also include camera 118 for acquiring images to help in work-piece location, laser location, work-piece inspection and the like (see, e.g., machine vision above).

Figure 2B:
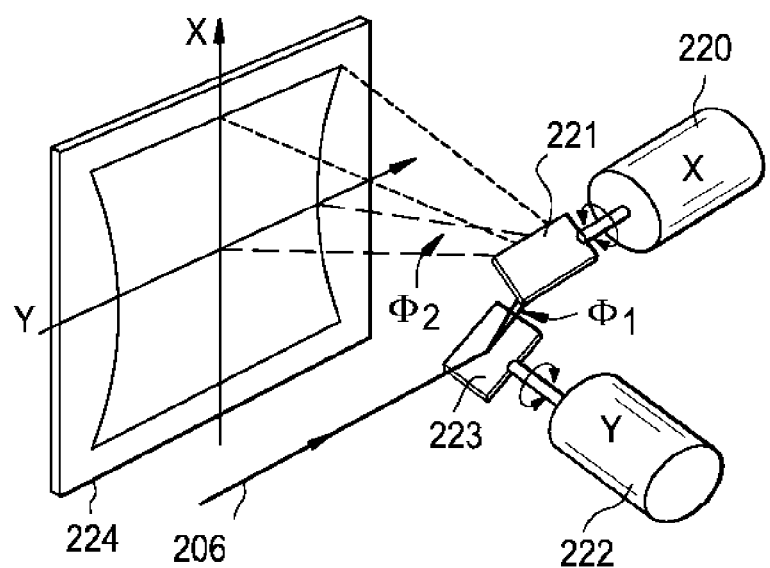
FIG. 2B illustrates a perspective view of galvanometer scanners included within the galvanometer scanning head unit for effecting movement of the laser beam, according to some embodiments of the present disclosure.

FIGS. 2A and 2B correspond to illustrations for the scan-head 202 and at least some of the components thereof, according to some embodiments of the present disclosure. As shown, scan-head 202 includes X-plane galvanometer scanning servo 220 for controlling associated galvanometer mirror 221, and Y-plane galvanometer scanning servo 222 for controlling associated galvanometer mirror 223. Deflections of one or another of the mirrors 221 and 223 effect movements of laser beam 206 along an X-Y plane 224 (e.g., output laser beam 205A or 205B). Other structure of scan-head 202 may include controllers 226A, 226B, and 226C, where one or another of which may be dedicated to a particular galvanometer scanning servo for example, as well as wires/communication lines 228, for receiving and/or sending at least one of control signals, power, and information to and/or from the scan head. The angle of deflection of incoming laser beam 206 off of mirror 223 may correspond to angle $\Phi_1$, and the angle of deflection off of mirror 221 may correspond to angle $\Phi_2$.

Figure 3A:
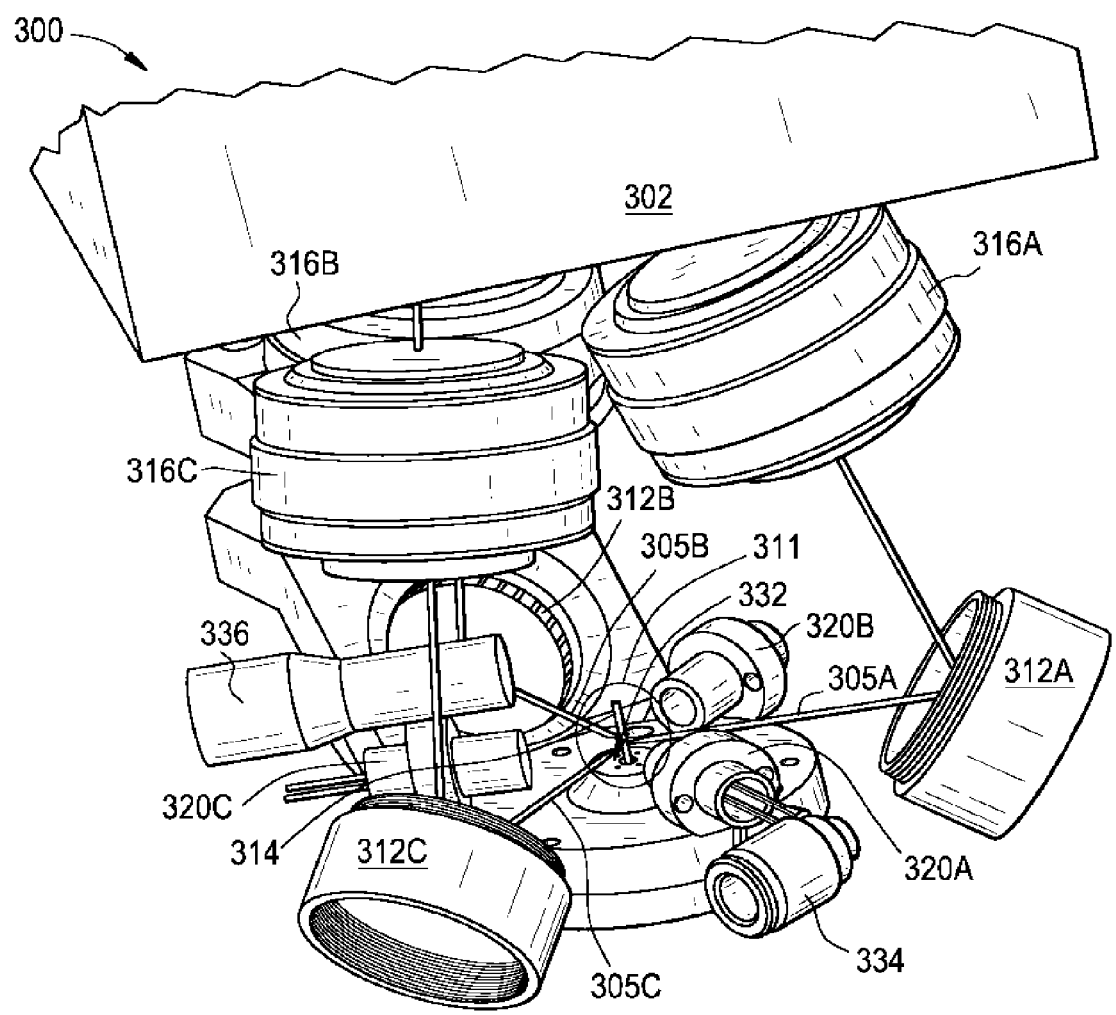
FIG. 3A illustrates a perspective view of a portion of a laser machining system for machining an object from multiple directions according to some embodiments of the present disclosure.
Figure 3B:
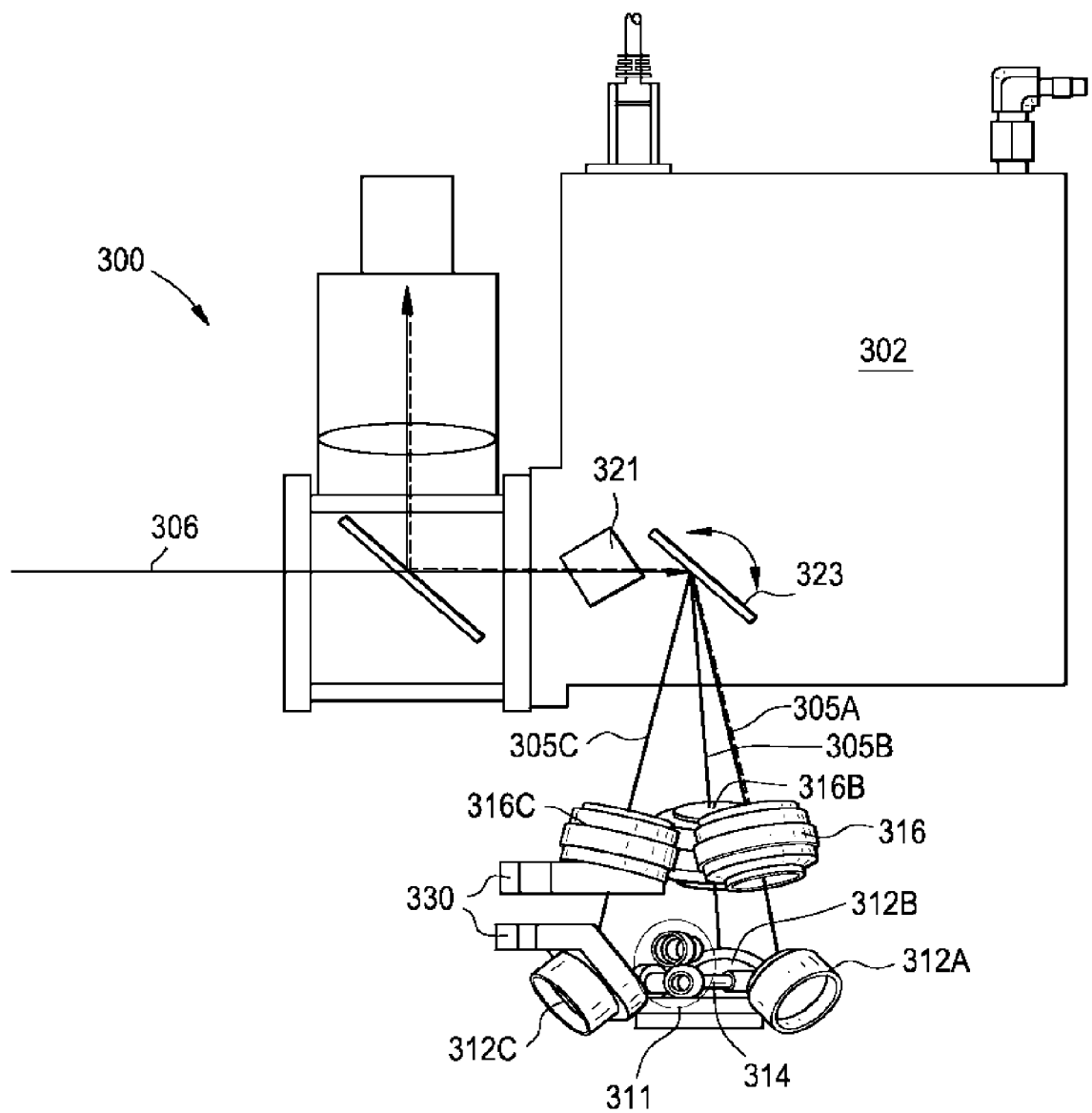
FIG. 3B illustrates a partial side, cut-away view of the laser machining system according to FIG. 3, showing internal components of the scan-head and associated structure.

FIGS. 3A, 3B and 3C illustrate embodiments of the present disclosure which are similar to those shown in the previous figures, although with slightly more detail. For such a system, as shown, in an effort to provide a clearer understanding of the elements of the system, a mechanical armature surrounding this portion of the system has been removed. Machining system 300, according to some embodiments, is provided which includes one or more, and preferably several or all of the following features: a galvanometer scanner head or scan head 302, which includes at least one and preferably two galvanometer mirrors 321, 323, focusing lenses 316 (316A for channel A, focusing lens 316B, for channel B, and focusing lens 316C for channel C). Also included, may be a plurality of mirrors 312 (which may be folding mirrors), where each of the mirrors corresponds to a particular area and field lens (i.e., a specific channel). Specifically, mirror 312A corresponds with lens 316A for associated channel A, mirror 312B corresponds with lens 316B for associated channel B and mirror 312C corresponds with lens 316C associated with channel C. The scan-head is controlled by a computer/controller (which may be connected to the scan-head/laser by wired and/or wireless connection) to direct the laser beam over a predetermined portion of a work-piece 314 via mirrors/lenses 312/316 (respectively), as well as control on/off, power and duration of the laser, such that a predetermined feature or pattern is machined on/into a particular area of the work-piece corresponding to a specific channel—i.e., at a location anywhere along the circumference of the work-piece.

It is worth noting that FIG. 3C corresponds to some embodiments in which only two mirrors 312A and 312C are utilized for creating folded beams for those two channels, and no mirror for channel C, effecting an unfolded beam. To that end, and as noted earlier, in some embodiments (e.g., FIG. 3C), it is not necessary to have each beam being "folded;" a folded beam arrives onto the work-piece/target via a mirror arranged after beam exits the galvanometer head, while a beam which is not folded arrives directly from the galvanometer (though via a scan lens) onto the work-piece/target. As shown in FIG. 3C, two beams are "folded" (i.e., via mirrors 312A and 312C) and arrive on the work-piece/target from two sides (e.g., 3 and 9 o'clock), while the third beam is not folded and arrives vertically onto the part (e.g., 12 o'clock). One of skill in the art will appreciate that in some embodiments of the present disclosure, other such configurations may be provided which utilize one or more or no folded beams.

Laser beam 306 emanating from a laser source (not shown), is directed upon each lens/mirror channel (i.e., A, B, C) by scan-head 302. Thus, the laser beam may be referred to as 305A, 305B and 305C depending upon which respective channel it is directed to (i.e., A, B, C). In some embodiments, as indicated above, an illuminating source 330 may be included to illuminate the work-piece through the scan-head so that the work-piece may be imaged by camera 318 (still or video). Accordingly, the system illustrated in FIGS. 3A-C may also include one or more LEDs, as illuminating source (though other illuminating sources could be used—any light source familiar to one of skill in the art) to illuminate the work-piece directly for processing. To that end, in some embodiments, a light source for each channel is provided: LED 320A for channel A, LED 320B for channel B, and LED 320C for channel C.

In some embodiments, one or more, and preferably a plurality, of process gas nozzles 332 are included. In the embodiments shown in FIGS. 3A-C, the nozzles may surround the work-piece for machining, however, other locations may be utilized as long as such nozzles function to disperse and/or remove smoke and/or debris resulting from the machining of the work-piece. To that end, a process gas inlet connector 334 enables connection to a source for the process gas nozzles.

The present disclosure presents a plurality of methods for machining a work-piece. In some embodiments, the method comprises a method for laser machining of a work-piece from a plurality of directions, using one or another of the embodiments described above, and includes the following. Preliminarily, for example, nominal deflection of the scan-head/galvanometer mirrors is established in order to direct the laser beam to a nominal location of the pattern to be machined. In addition, a relationship is established between systems of coordinates for the scan-head controller and a camera (if included). Preparation of a motion control program(s) operational on the system/PC/controller controlling the laser machining system to machine desired features is also established.

Figure 4A:
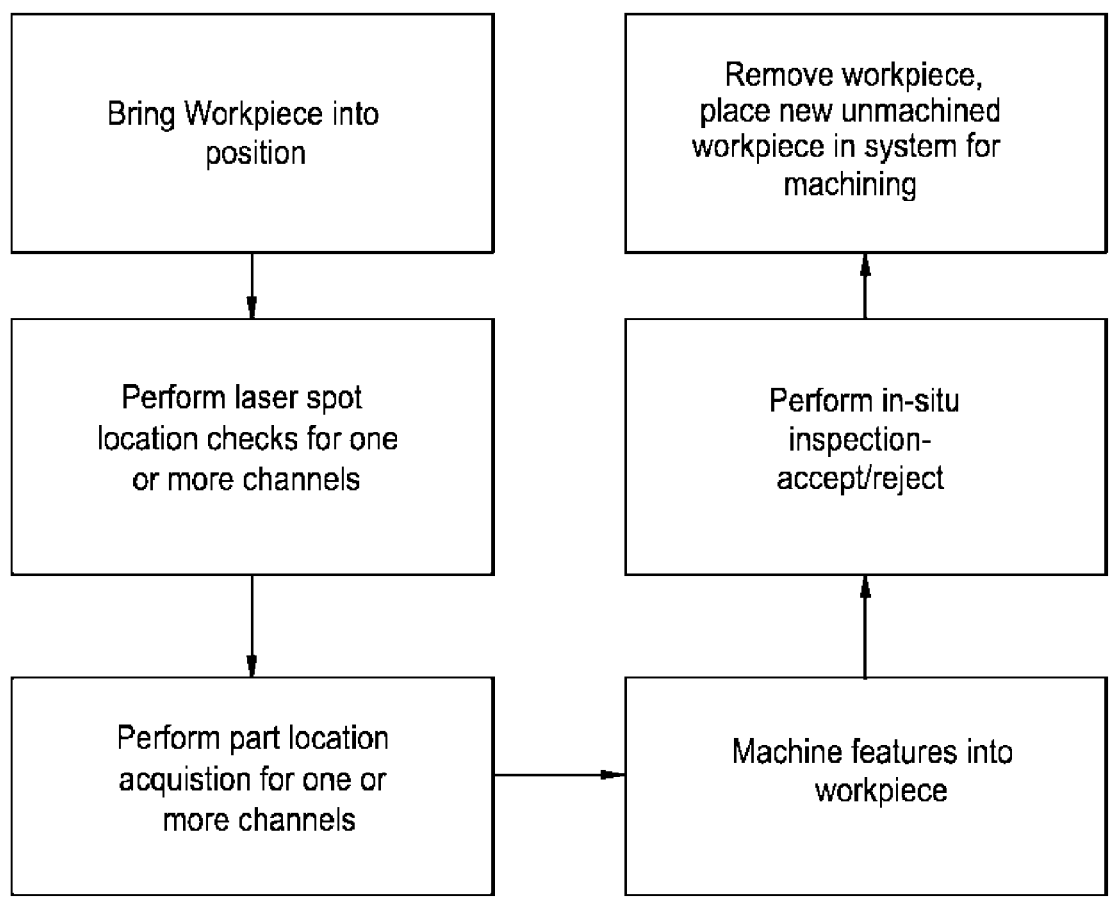
FIGS. 4A-E represent flow diagrams of various method embodiments of the subject disclosure, including, for example (and not limited to) a method for machining an object from multiple directions according to some embodiments of the present disclosure (e.g., FIG. 4A), where details for the one or more processes outlined in FIG. 4A can be found in FIGS. 4B-4E.
Figure 4B:
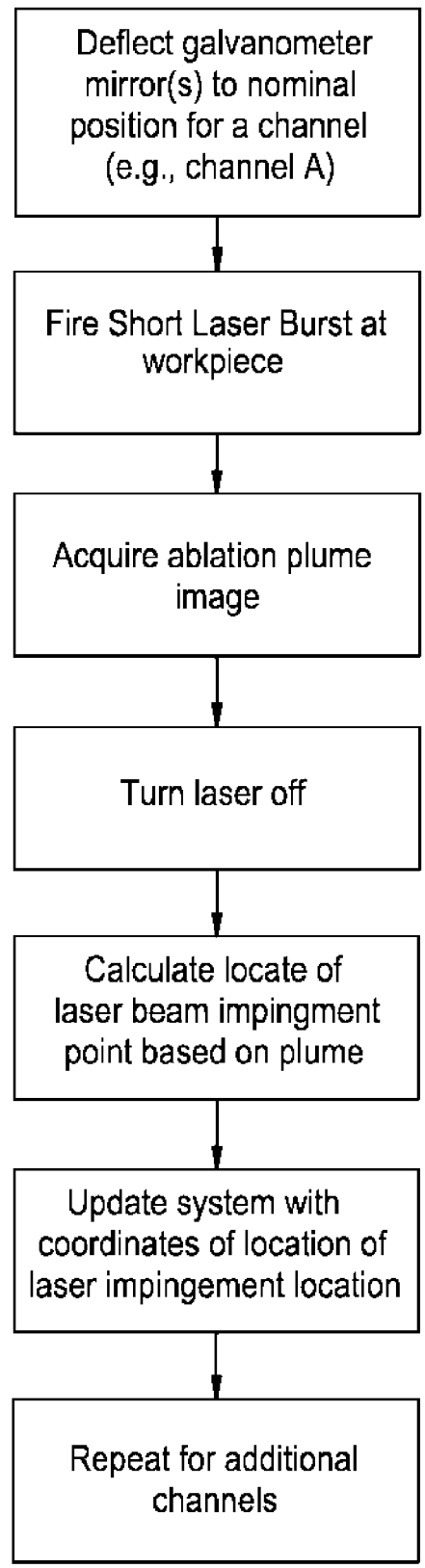
Figure 4C:
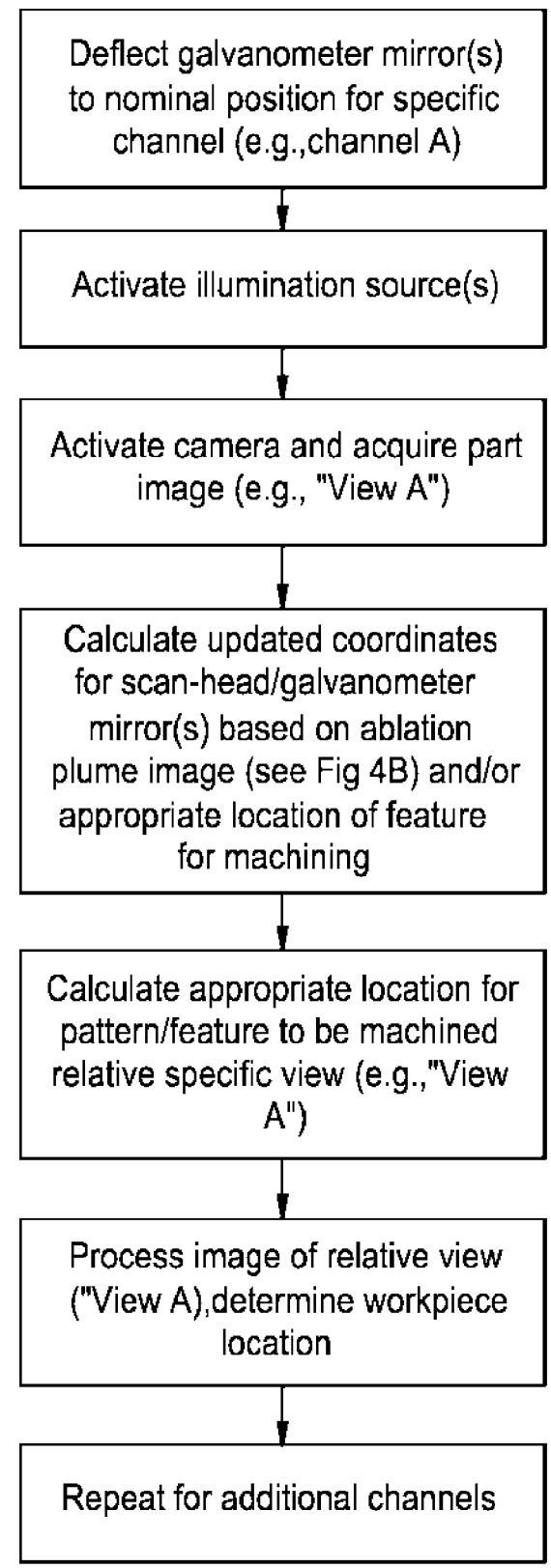

In order to laser machine a work-piece (e.g., a catheter) for some embodiments, for example, one or more, and preferably, several, and most preferably, all of the following fabrication steps are carried out. An example of such embodiments of an overall method is outlined in the flow diagram shown in FIG. 4A (particularities of several of the steps noted in FIG. 4A are found with reference to FIGS. 4B-4E). Accordingly, the work-piece is first brought into position at a work-piece area of the system (see FIG. 3, ref. numeral 311). Thereafter, laser spot location checks (e.g., such as that found in the flow diagram of FIG. 4B) may be performed on one or more, and preferably each channel of the plurality of channels (e.g., channels A, B, and C), so that if there is a drift in the output beam (e.g., its location and/or angular direction), and if there are changes in the alignment of the mirrors and another element in the path delivering the laser beam to at least one of the galvanometer mirrors and/or target/work-piece, such a drift(s) require compensation, and thus, in some embodiments, require monitoring. Thus, the system can then determine if the laser is adequately aimed and/or that the coordinate system presently being used by the controller is true. To accomplish the laser spot location checks, in some embodiments of the present disclosure, a scan-head galvanometer mirror(s) (e.g., 321, 323) is deflected to its corresponding nominal position through one of the channel mirrors, for example, mirror 312A, and then one or more laser pulses is fired. Each pulse may have a duration from femto-seconds to milliseconds, and if more than one pulse is fired, such pulses can arrive as a burst at the rate from about 1 Hz to about 300 kHz. As a result of the laser firing, an ablation plume image is captured (either during or immediately after the laser burst). The location of the ablation plume is determined and the system updated (e.g., at least one of the coordinate systems of the camera and scan-head/galvanometer scanning mirrors) with the location of the plume—i.e. the location of the laser beam impingement on work-piece for the relative channel. Alternatively, the location of the plume may be compared with an earlier estimated location of the plume (or a feature which is effected onto the surface of the work-piece by the laser may be compared to such an earlier estimated location), and one or more coordinate systems updated based on the actual location of the plume/feature. Thus, in some embodiments, it is determined if the actual location of the laser as it impinges the surface of the work-piece corresponds to the location that the system controller had previously determined the laser to strike. If the location is not correct, the system is updated in at least one of the memory and application program of the system so that the laser can be now accurately aimed at the work-piece for the relevant channel. This process may be repeated for at least one of the remainder of the channels (e.g., channels B and C), and in some embodiments, it is repeated for all remaining channels.

Alternatively, in some cases, instead of monitoring the laser ablation plume, one can monitor the location of the laser mark on the surface of the work-piece. The choice between plume and mark is determined by the relative visibility of each, which can be different for different lasers, spot sizes, laser energies and work-piece materials.

Subsequent to the laser spot location check (according to some embodiments), the work-piece location may be acquired for at least one channel, and preferably, for each of the plurality of channels (e.g., A, B, and C). An exemplary flowchart for such a process, according to some embodiments, can be found with reference to FIG. 4C. In that regard, and starting with channel A, for example, the scan-head mirror(s) is deflected to its nominal position through mirror 312a. Thereafter, one or more illuminating sources (e.g., LED(s) 320) are activated so that a camera can image the work-piece/channel to produce view A of the work-piece. Preferably, the image is a digital image. Based on the image, the work-piece location is determined, by comparing the actual location of the work-piece relative to at least one known marker in the image. Such a marker may be one or another (or several) elements/structure of the system including an element of the camera, for example, the center of its field of view. Accordingly, an appropriate location on the work-piece for the pattern to be machined on the work-piece is determined relative to view A (i.e., relative to channel A) and the scan-head coordinate system is updated based on at least one of the part location and the plume image (in some embodiments, based on both). The process may then be repeated for at least one of the other channels (B and C), and in some embodiments, preferably both channels.

Figure 4D:
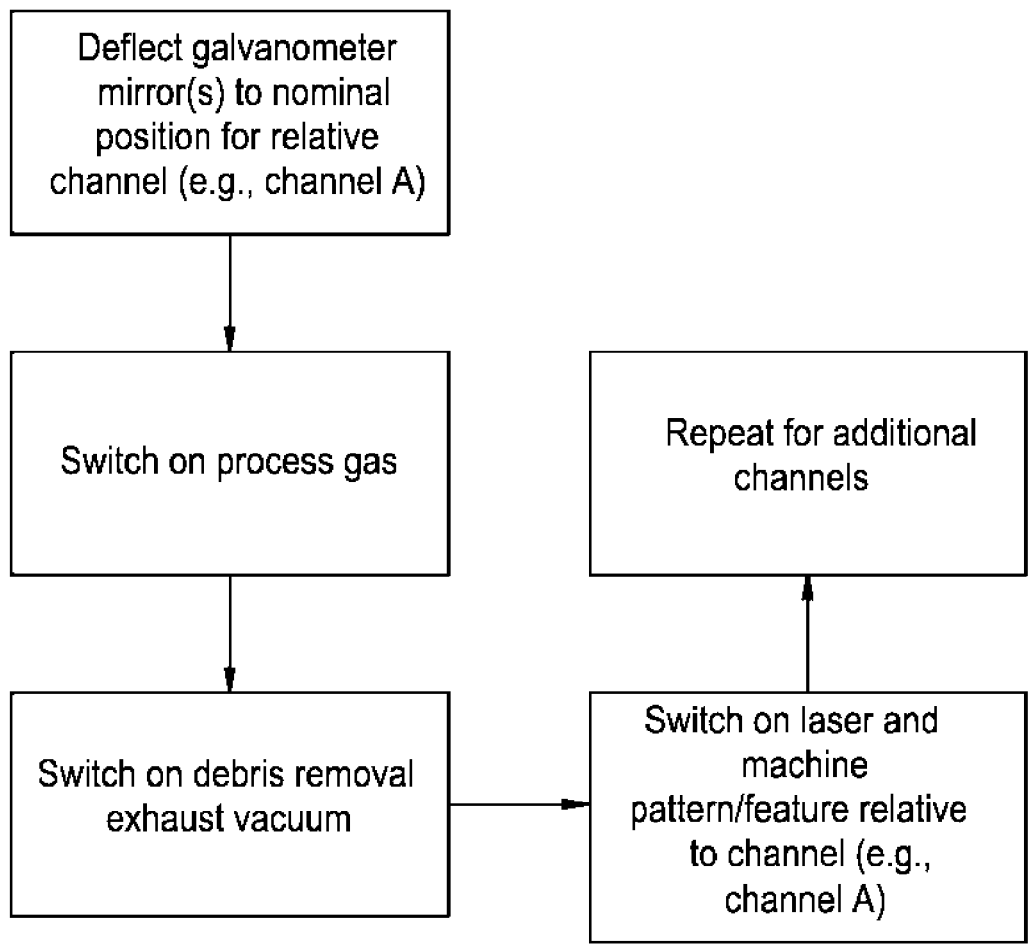
Figure 4E:
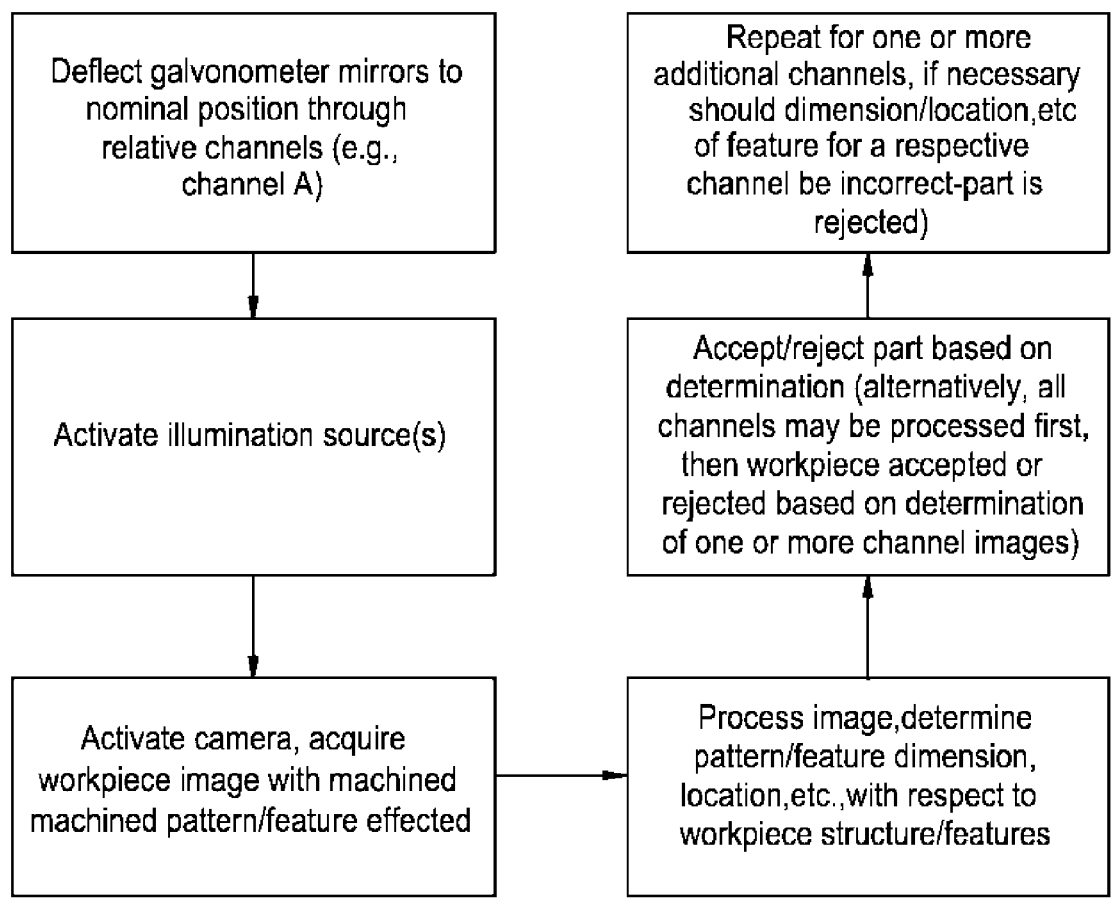

After at least one of the laser spot location checks and performance of work-piece location acquisition, and in some embodiments, preferably both are performed, the pattern is sequentially machined into the work-piece, an exemplary process flow for some embodiments can be found in FIG. 4D. According to some embodiments, the pattern includes specific portions for each channel. Thus, for the three (3) channel system illustrated in FIGS. 3A-C, the pattern includes pattern portion A for channel A, pattern portion B for channel B and pattern portion C for channel C. Thus, for example, pattern portion A is first machined (e.g., drilled) into the work-piece along channel A (i.e., lens 316A, mirror 312A) by deflecting the scan-head mirror(s) to its nominal position through mirror A. The flow of process gas may then be switched on, as well as a debris removal exhaust vacuum 336. The laser is then switched on, and is projected onto a portion of the work-piece arranged relative to channel A (i.e., portion "A" or view A of the work-piece), to produce a desired pattern. This portion of the pattern is preferably based on the updated coordinates for the scan-head determined in the performance of the steps to acquire part location. Thereafter, the above process for sequential machining is carried out for at least one other channel, and preferably, in some embodiments, for all channels.

During the machining process, inspection of the machining of the work-piece may be performed for at least one channel, or in some embodiments, for two or more channels, and in some embodiments, all channels. Such a process, according to some embodiments, is outlined in the exemplary process flow shown in FIG. 4E. Accordingly, in some embodiments, the following process for in-situ inspection may be performed for a channel (each/plurality/all). The scan-head mirror(s) are deflected to a nominal position for mirror/channel A (for example). The illumination sources (e.g., one or more LEDs) are activated, so as to illuminate the portion of the work-piece corresponding to the area for which machining is accomplished for channel A ("portion A"). Thereafter, the camera is activated so as to acquired an image (e.g., digital image) of portion A, having the portion of the pattern recently machined thereon ("view A"). The view A image is then processed, and such that the pattern machined thereon is checked for dimensions, location, and the like, with respect to known work-piece features (e.g., tolerances, and/or comparison to ideal values). This process is then repeated for one or more (and preferably all) other channels. The process may be performed by computer/automatically, or may also be performed by a technician. Depending upon the results of the tolerances/comparison to ideal values, the part is either accepted or rejected. Results of the inspection, and/or rejection of the machined work-piece may then be logged, preferably together with other parameters of the system (e.g., laser power, pulse rate, etc.). In some embodiments, the inspection is carried out automatically by the system through computer control (for example) and corresponding application programming, and the like. It is preferably handled by computer/controllers such that the process can occur at a fast rate, rather than inspection by a technician, so that throughput is minimally affected. Thereafter, the work-piece with the machined pattern (if all machining for each channel has been completed and, preferably, also inspected), is removed from the system and a new un-machined work-piece is placed therein—either by a technician or via robotics.

In some aspects, the current subject matter can dynamically detect the work-piece position for one or more optical channels and dynamically adjust the focus for each of these channels. Detection of work-piece position can aid in machining if: (a) the work-piece is moving or bent, or not consistently positioned in the laser beams; and/or (b) if the laser depth of focus is too shallow to accommodate for these focus variations. A camera, galvanometer scanner and multiple lenses and mirrors can be used to view the work-piece from different directions (e.g., along the one or more optical channels). The camera can look at or "view" the work-piece through the same optical path that is traveled by the laser beam through the one or more optical channels. Steering the laser beam from different directions also enables viewing the work-piece from different directions and deducing or determining the location of the work-piece in space. Knowledge of work-piece position can enable control of optical components within the optical path of the laser beam to shift the focus and/or direction of the laser beam to the surface of the work-piece. The focus can be adjusted for each orientation of the laser beam around the work-piece. Focusing can be performed using a camera and computer control to capture one or more images, calculate the location of the work-piece, and control the optical components, such as a focus actuator and mirrors for directing the laser beam.

Figure 5:
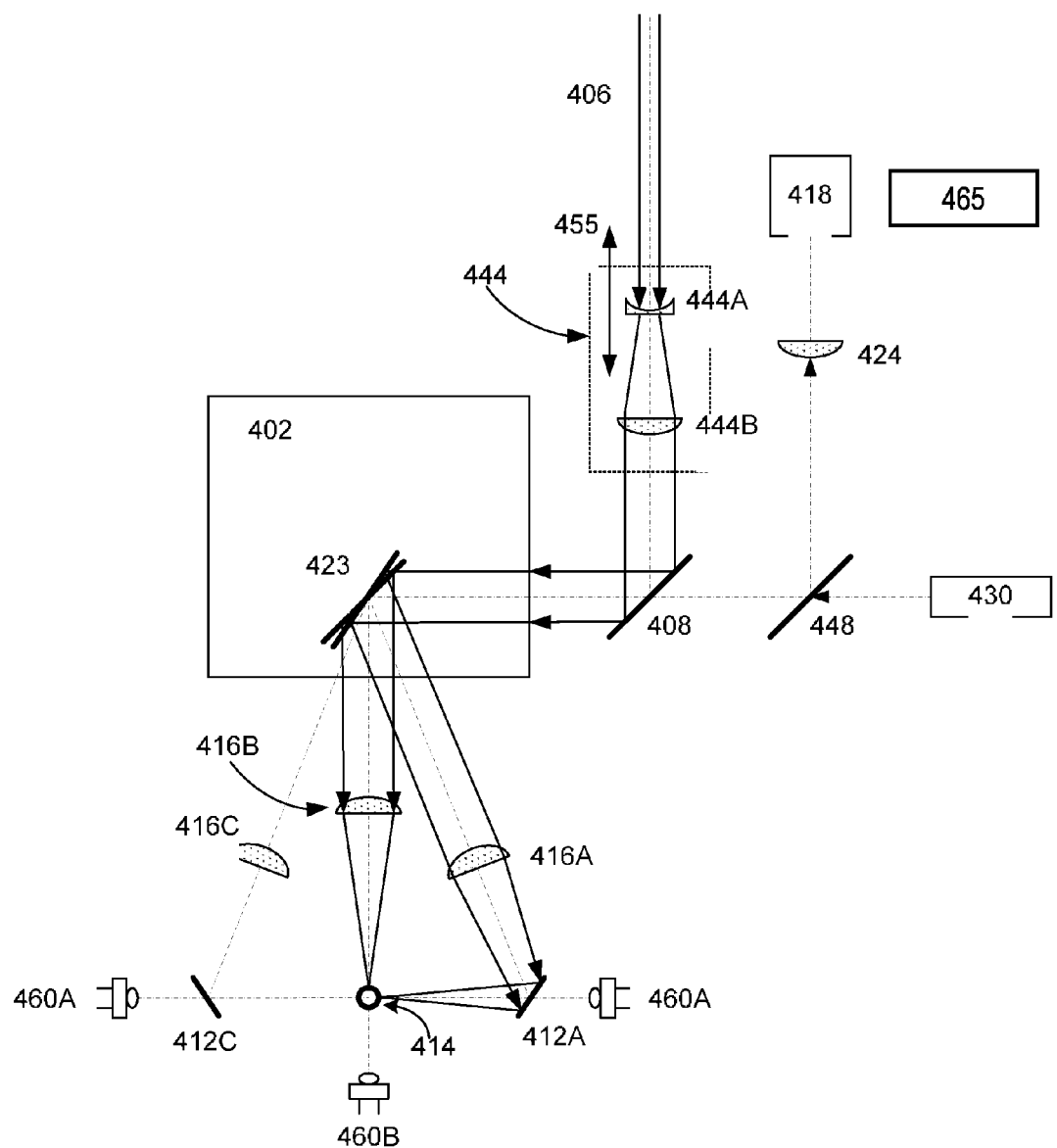
FIG. 5 illustrates a laser machining system for machining an object from multiple directions and dynamically adjusting a laser beam focus according to some embodiments of the present disclosure.

FIG. 5 illustrates a laser machining system 400 for machining an object from multiple directions and dynamically adjusting a laser beam focus according to some embodiments of the present disclosure. A laser beam 406 passes through an adjustable beam expander/collimator 444 having an adjustable lens 444A with a linear actuator allowing adjustable lens 444A to move along direction 455. In combination with a fixed lens 444B, this enables adjustment of laser beam divergence and therefore of the focusing on a work-piece 414. The laser beam 406 passes through a dichroic beam-splitter 408, then through a XY laser scanning head 402, such as a galvanometer scanner, which may include at least one scanning mirror 423 to steer the laser beam 406 in one or more directions and through the one or more optical channels. In one scanning mirror 423 position, the laser beam 406 goes through an optical subsystem that includes a focusing lens 416B that focuses the laser beam 406 on the work-piece within an optical channel (e.g., channel B) associated with focusing lens 416B. In a second scanning mirror 423 position, the laser beam 406 passes through a second optical subsystem that includes a focus lens 416A that focuses the laser beam 406 on the work-piece 414 within an optical channel (e.g., channel A) associated with focusing lens 416A, which may include a turning or folding mirror 412A, as shown in FIG. 5, that deflects the laser beam toward and onto the work-piece. An image acquisition device 418, such as a camera, views the work-piece 414 through the same optical path as the laser beam 406, via dichroic mirrors 408 and 448 and a camera lens 424, whether it be along an optical channel associated with focusing lens 416B or an optical channel associated with focusing lens 416A.

Laser machining system 400 thus can include one or more optical channels, denoted as channel A, channel B, and channel C (although less than three or more than three channels are possible), as shown in FIG. 5. Laser scanning head 402 can direct the laser beam onto the work piece 414 through channels A, B, and/or C at different times allowing different portions of the work-piece to be machined by the laser beam. In an implementation, channels A and B can provide substantially orthogonal views of the work-piece 414, although other configurations and non-orthogonal views are contemplated.

Illumination is possible through several modalities, for example, via common upstream illuminator 430 illuminating via the shared optical path and/or via light-emitting diode (LED) illuminators 460A, 460B, and/or 460C located proximal work-piece 414. The laser's wavelength can typically be at a different spectral region than the light used to illuminate the work-piece 414 (e.g., LEDs 460 A, B, C and/or common upstream illuminator 430).

Work-piece 414 can have an ideal position (e.g., an origin) for machining. However, due to work-piece 414 moving, bending, or not consistently being positioned in the ideal position, system 400 can acquire images and determine a position displacement of the work-piece 414 as viewed through one or more optical channels. Displacement of the work-piece as viewed through the one or more optical channels can be one or both of depth displacement (e.g., too near or too far) and/or lateral displacement (e.g., too left or too right), also sometimes referred to as offsets and shifts, respectively. The ideal depth for a given channel can also be referred to as the best optical focus position of a given channel. In some embodiments system 400 can compensate for lateral displacement of the work-piece 414 by controlling laser scanning head 402, including the one or more scanning mirrors 423 and/or one or more folding mirrors (412A and/or 412C as shown in FIG. 5). In some embodiments system 400 can compensate for depth displacement of a given channel by controlling the adjustable lens 444A.

Depth displacement of the work-piece 414 as viewed through a given optical channel can be determined by acquiring images through a different optical channel. For example, the image acquisition device 418 can be positioned to view the work-piece 414 through optical channel A associated with focusing lens 416A as shown in FIG. 5. The image acquisition device 418 can acquire via optical channel A one or more images of the work-piece 414 that depict the work-piece 414 as being too high or too low in the view, which in turn indicates a depth displacement of the work-piece 414 with reference to the best optical focus position of channel B as being either too near or too far, respectively, from the best optical focus position. In other words, channel A is utilized to determine the distance of the work-piece 414 along channel B's depth axis (or, referring to an alternative frame of reference, channel A is utilized to determine the distance of the work-piece from the focusing lens 416B of channel B) to calculate whether the laser beam is converging appropriately on the work-piece 414, i.e., the work-piece 414 is at the best optical focus position of the laser beam 406, or the work-piece 414 is in front of or behind the best optical focus position of the laser beam 406. In some implementations, determination of depth displacement for channel B can be performed by, using the acquired images from channel A and image processing and/or machine vision techniques, computing a distance within the image between the work-piece 414 and the best optical focus position for channel B. The best optical focus position for channel B as viewed through channel A may be predetermined, predefined, and/or determined during a calibration procedure.

To determine a depth displacement for channel A, one or more images can be acquired using channel B. In some implementations, determination of depth displacement for channel A can be performed using the acquired images from channel B and by computing a distance within the image between an origin (e.g., zero) position and a current position of the work-piece 414 (i.e., to the left or the right of the origin). Likewise, in the example arrangement of FIG. 5, a depth displacement for channel C can be determined by acquiring images using channel B. Other methods of determining the depth displacement using the acquired images are possible.

Lateral, or side-to-side displacement of the work-piece 414 within a given channel can be determined by acquiring images through that same channel. For example, the image acquisition device 418 can acquire images through channel A to determine a lateral displacement of the work-piece 414 with respect to a best lateral position of channel A. Likewise, image acquisition device 418 can acquire images through channel B to determine a lateral displacement of the work-piece 414 with respect to a best lateral position of channel B. Similar images can be acquired to determine lateral displacement with respect to channel C. In some implementations, determination of a lateral displacement for channel A can be performed using the acquired images from channel A and image processing and/or machine vision techniques and by computing a distance within the image between the work-piece 414 and the best lateral position (e.g., the ideal position or work-piece 414 origin) for channel A. Likewise, lateral displacement can be computed for each of channels B and C using images acquired via channels B and C, respectively.

The system 400 of FIG. 5 can include a controller 465 to compute the depth and/or lateral displacement of the work-piece 414 in one or more of channels A, B, and/or C. Controller 465 can also cause adjustment of the adjustable lens 444A to focus the laser beam 406 on the work-piece 414 when the laser beam 406 is directed to the work-piece 414 via the optical channels A, B, and/or C. Adjustment of adjustable lens 444A can be based on the determined depth displacement for a given channel. Controller 465 can also cause scanning mirrors 423 and/or folding mirrors 412A and 412B to adjust to direct the laser beam 406 to the work-piece 414 based on the determined lateral displacement.

Controller 465 can also control other components of the system 400, such as the scanning-head 402, components of the scanning-head 402, image acquisition device 418, and laser 406.

In some implementations, image acquisition device 418 can acquire images through one or more of the optical channels during laser machining of the work-piece 414 to dynamically measure, using the acquired images, the position of the work-piece 414 (including the lateral and depth displacements). In some implementations, system 400 can compensate for the position of the work-piece 414 during laser machining of the work-piece 414.

In operation and according to an example implementation, laser scanning head 402 steers the view of the image acquisition device 418 to observe work-piece 414 from the direction of focus lens 416B (e.g., through optical channel B). The depth-wise positioning of the work-piece 414 along the optical channel A can be measured by acquiring one or more images along optical channel B, determining whether the work-piece 414 is off-center from an identified origin or zero point with respect to optical channel B, and thereafter calculating that off-center distance, which in turn equates to the depth displacement of the work-piece 414 along optical channel A. The focus of the laser beam along the optical channel A can be corrected by adjustable lens 444A based on the image acquisition device 418 images acquired from direction of lens 416B (e.g., through optical channel B) and the determined displacement.

Next, laser scanning head 402 steers the view of image acquisition device 418 to observe the work-piece 414 from the direction of lens 416A and folding mirror 412A (e.g., through optical channel A). The depth-wise positioning of the work-piece 414 along the optical channel B can be measured by acquiring one or more images along optical channel A, determining whether the work-piece is off-center (e.g., above or below) an identified origin or zero point with respect to optical channel A and thereafter calculating that off-center distance, which in turn equates to the depth displacement of the work-piece 414 along optical channel B. The focus of the laser beam along the optical channel B can be corrected by adjustable lens 444A based on the image acquisition device 418 images acquired from direction of lens 416A (e.g., through optical channel A) and the determined displacement.

Laser scanning head 402 may also steer the view of the image acquisition device 418 to the work-piece 414 from the direction of lens 416B (e.g., through optical channel B) for purposes of determining the lateral beam position with respect to optical channel B and correcting the same by appropriate tilt of scanning mirrors 423 based on the measurement of the position of the work-piece 414 from an origin or zero point. Similarly, laser scanning head 402 may also steer the view of the image acquisition device 418 to the work-piece 414 from the direction of lens 416A and folding 412A (e.g., through optical channel A) for purposes of determining the lateral beam position with respect to optical channel A and correcting the same by appropriate tilt of scanning mirrors 423 based on the measurement of the position of the work-piece 414 from an origin or zero point.

Using the current subject matter, both the lateral displacement of the work-piece 414 (across the impinging beam) and its axial or depth displacement (along the beam's direction) can be determined and compensated for to maintain the laser beam 406 centered on work-piece 414 and in focus.

FIG. 6 is a process flow diagram illustrating another example process 600 for laser machining a work-piece to compensate for the position of the work-piece and using the laser machining system 400 of FIG. 5. At 610, an image of the work-piece 414 can be acquired by image acquisition device 418 via one of the optical channels (channel A, B, or C). At 620, a displacement of the work-piece from a best optical focus position of a different channel can be determined using the acquired image of the work-piece 414.

At 630, adjustable lens 444A can be controlled to focus the laser beam 406 when the laser beam 406 is directed to the work-piece 414 via the corresponding optical channel to compensate for the determined displacement. The current subject matter can be performed as a calibration procedure (e.g., before machining a work-piece) or dynamically during machining of the work-piece (e.g., to compensate for any shifts or displacements that may occur during the machining process).

Various embodiments of the subject matter described herein may be realized in digital electronic circuitry, integrated circuitry, specially designed ASICs (application specific integrated circuits), computer hardware, firmware, software, and/or combinations thereof. These various embodiments may include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device. In particular, some embodiments include specific "modules" which may be implemented as digital electronic circuitry, integrated circuitry, specially designed ASICs (application specific integrated circuits), computer hardware, firmware, software, and/or combinations thereof.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, web-pages, books, etc., presented in the present application, are herein incorporated by reference in their entirety.

Although a few variations have been described in detail above, other modifications are possible. For example, the logic flows depicted in the accompanying figures and described herein do not require the particular order shown, or sequential order, to achieve desirable results.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the exemplary claims. Other aspects, advantages, and modifications are considered to be within the scope of the following exemplary claims. The exemplary claims presented are representative of only some of the embodiments and features disclosed herein. Other unclaimed embodiments, inventions, and features are also contemplated.

What is claimed is:

1. A laser machining system for machining a work-piece, the system comprising:
    a laser scanning head;
    external optical subsystems corresponding to optical channels comprising a first optical channel and a second optical channel, the laser scanning head controlling an optical path so that a laser beam is directed and focused on the work-piece through the first optical channel and the second optical channel at different times, the first optical channel and the second optical channel corresponding to respective specific portions of the work-piece to be machined by the laser beam; and an image acquisition device positioned to view the work-piece through the optical path, the image acquisition device acquiring via the first optical channel one or more images of the work-piece to determine a displacement of the work-piece with reference to a best optical focus position of the second optical channel.

2. The laser machining system of claim 1, wherein the image acquisition device acquires one or more images via the second optical channel to determine a displacement of the work-piece with reference to a best optical focus position of the first optical channel.

3. The laser machining system of claim 2, wherein the optical channels comprise three or more optical channels and wherein the image acquisition device acquires via one or more of the three or more optical channels one or more images of the work-piece to determine a displacement of the work-piece with reference to a best focus position of another of the three or more optical channels.

4. The laser machining system of claim 1, further comprising:
an adjustable lens positioned in the optical path; and
a controller to compute a displacement of the work-piece with reference to the best optical focus position of the second optical channel using the position of the work-piece with reference to the second optical channel and cause adjustment of the adjustable lens to focus the laser beam on the work-piece when the laser beam is directed to the work-piece via the second optical channel.

5. The laser machining system of claim 2, further comprising:
a controller to compute a displacement of the work-piece with reference to the best optical focus position of the first optical channel using the position of the work-piece with reference to the first optical channel and causes adjustment of an adjustable lens to focus the laser beam on the work-piece when the laser beam is directed to the work-piece via the first optical channel.

6. The laser machining system of claim 2, wherein the one or more images acquired via the first optical channel are used to determine a lateral displacement of the work-piece with reference to the first optical channel, and the one or more images acquired via the second optical channel are used to determine a lateral displacement of the work-piece with reference to the second optical channel.

7. The laser machining system of claim 6 further comprising:
a scanning mirror positioned in the optical path; and
a controller to compute a lateral displacement for the first optical channel using the position of the work-piece with reference to the first optical channel and cause the scanning mirror to adjust the laser beam direction when the laser beam is directed through the first optical channel to compensate for a lateral displacement of the work-piece, the controller to compute a lateral displacement for the second optical channel using the position of the work-piece with reference to the second optical channel and cause the scanning mirror to adjust the laser beam direction when the laser beam is directed through the second optical channel to compensate for the lateral displacement of the work-piece.

8. The laser machining system of claim 1, wherein the first optical channel and the second optical channel provide substantially orthogonal views of the work-piece.

9. The laser machining system of claim 1, wherein the image acquisition device acquires images during laser machining of the work-piece to dynamically measure, using images acquired via the first optical channel, the position of the work-piece with reference to the second optical channel.

10. The laser machining system according to claim 1, further comprising an illumination source for illuminating the work-piece for imaging by the image acquisition device.

11. The laser machining system according to claim 1, further comprising a laser and a controller, wherein the controller controls at least one of the scanning-head, components of the scanning-head, image acquisition device, and the laser.

12. The laser machining system according to claim 1, wherein the optical subsystems each receive separately and at different times the laser beam from the laser scanning head, and each of the optical subsystems includes a lens to focus the laser beam.

13. A method for laser machining a work-piece, the method comprising:
acquiring a first image of the work-piece by an image acquisition device and via a first optical channel, the image acquisition device forming part of a system further comprising a laser scanning head, an adjustable lens, and external optical subsystems corresponding to optical channels comprising the first optical channel and a second optical channel, the laser scanning head controlling an optical path so that a laser beam passes at different times through the first optical channel and the second optical channel, the first optical channel and the second optical channel corresponding to respective specific portions of the work-piece to be machined by the laser beam;
determining, using the first image of the work-piece, a displacement of the work-piece with reference to a best optical focus position of the second optical channel; and
controlling the adjustable lens to focus the laser beam when the laser beam is directed to the work-piece via the second optical channel to compensate for the determined displacement.

14. The method of claim 13, further comprising:
acquiring a second image of the work-piece by the image acquisition device via the second optical channel;
determining, using the second image of the work-piece, a displacement of the work-piece with reference to a best optical focus position of the first optical channel; and
controlling the adjustable lens to focus the laser beam when the laser beam is directed to the work-piece via the first optical channel to compensate for the determined displacement.

15. The method of claim 14, further comprising:
determining, using the first image acquired via the first optical channel, a lateral displacement of the work-piece with reference to the first optical channel; and
controlling a scanning mirror to adjust the laser beam direction when the laser beam is directed through the first optical channel to compensate for the determined lateral displacement the work-piece.

16. The method of claim 15, further comprising:
determining, using the second image acquired via the second optical channel, a lateral displacement of the work-piece with reference to the second optical channel; and controlling the scanning mirror to adjust the laser beam direction when the laser beam is directed through the second optical channel to compensate for the determined lateral displacement of the work-piece.

17. The method of claim 13, wherein the first optical channel and the second optical channel provide substantially orthogonal views of the work-piece.

18. The method of claim 13, further comprising: dynamically determining, using images acquired via the first optical channel and during a period of time of laser machining of the work-piece, the displacement of the work-piece with reference to the best optical focus position of the second optical channel.

19. The method of claim 13, further comprising illuminating, using an illumination source, the work-piece for imaging by the image acquisition device.

20. The method of claim 13, the system further comprising a laser and a controller, wherein the controller controls at least one of the scanning-head, components of the scanning-head, the image acquisition device, and the laser.

21. The method of claim 13, wherein the external optical subsystems each receive separately and at different times the laser beam from the laser scanning head, and each of the external optical subsystems includes a lens to focus the laser beam.

22. A laser machining system for machining a work-piece, the system comprising:
   a laser scanning head;
   external optical subsystems corresponding to optical channels comprising two or more optical channels, the laser scanning head controlling an optical path so that a laser beam passes at different times through each of the two or more optical channels, each of the two or more optical channels corresponding to a respective specific portion of the work-piece to be machined by the laser beam; and
   an image acquisition device positioned to view the work-piece through the optical path, the image acquisition device acquiring via two or more of the two or more optical channels two or more images of the work-piece to measure a position of the work-piece with reference to one of the two or more optical channels.

23. The laser machining system of claim 22, wherein the optical channels comprise three or more optical channels and wherein the image acquisition device acquires via two or more of the three or more optical channels two or more images of the work-piece to determine a displacement of the work-piece with reference to a best focus position of another of the three or more optical channels.

24. The laser machining system of claim 22, further comprising:
   an adjustable lens positioned in the optical path; and
   a controller to compute the position of the work-piece with reference to a best optical focus position using the position of the work-piece with reference to the one of the two or more optical channels and cause adjustment of the adjustable lens to focus the laser beam on the work-piece when the laser beam is directed to the work-piece via the one of the two or more optical channels.

25. The laser machining system of claim 22, wherein the one or more images acquired via the first optical channel are used to determine a lateral displacement of the work-piece with reference to the first optical channel, and the one or more images acquired via the second optical channel are used to determine a lateral displacement of the work-piece with reference to the second optical channel.

26. The laser machining system of claim 25 further comprising:
   a scanning mirror positioned in the optical path; and
   a controller to compute a lateral displacement for one of the two or more optical channels using the position of the work-piece with reference to one of the two or more optical channels optical channel and cause the scanning mirror to adjust the laser beam direction when the laser beam is directed through one of the two or more optical channels to compensate for a lateral displacement of the work-piece.

27. The laser machining system of claim 22, wherein two of the two or more optical channels provide substantially orthogonal views of the work-piece.

28. The laser machining system of claim 22, wherein the image acquisition device acquires images during laser machining of the work-piece to dynamically measure, using images acquired via the one of the two or more optical channels, the position of the work-piece with reference to one of the two or more optical channels.

29. The laser machining system according to claim 22, further comprising an illumination source for illuminating the work-piece for imaging by the image acquisition device.

30. The laser machining system according to claim 22, further comprising a laser and a controller, wherein the controller controls at least one of the scanning-head, components of the scanning-head, image acquisition device, and the laser.

31. The laser machining system according to claim 22, wherein the optical subsystems each receive separately and at different times the laser beam from the laser scanning head, and each of the optical subsystems includes a lens to focus the laser beam.

32. A method for laser machining a work-piece, the method comprising:
   acquiring one or more images of the work-piece by an image acquisition device and via each of two or more optical channels, the image acquisition device forming part of a system further comprising a laser scanning head, an adjustable lens, and external optical subsystems corresponding to optical channels comprising the two or more optical channels, the laser scanning head controlling an optical path so that a laser beam passes at different times through each of the two or more optical channels, each of the two or more optical channels corresponding respectively to specific portions of the work-piece to be machined by the laser beam;
   determining, using the one or more images of the work-piece, a position of the work-piece with reference to one of the two or more optical channels; and
   controlling the adjustable lens to focus the laser beam when the laser beam is directed to the work-piece via the second optical channel to compensate for the determined position.

33. The method of claim 32, further comprising:
   determining, using the second image of the work-piece, a displacement of the work-piece with reference to a best optical focus position of one of the two or more optical channels; and
   controlling the adjustable lens to focus the laser beam when the laser beam is directed to the work-piece via one of the two or more optical channels to compensate for the determined displacement.

34. The method of claim 33, further comprising:
   determining, using the one or more images acquired via the two or more optical channels, a lateral displacement of the work-piece with reference to one of the two or more optical channels; and controlling a scanning mirror to adjust the laser beam direction when the laser beam is directed through one of the two or more optical channels to compensate for the determined lateral displacement the work-piece.

35. The method of claim 32, wherein the two of the two or more optical channels provide substantially orthogonal views of the work-piece.

36. The method of claim 32, further comprising: dynamically determining, using images acquired via the two or more optical channels and during a period of time of laser machining of the work-piece, the displacement of the work-piece with reference to the best optical focus position of one of the two or more optical channels.

37. The method of claim 32, further comprising illuminating, using an illumination source, the work-piece for imaging by the image acquisition device.

38. The method of claim 32, the system further comprising a laser and a controller, wherein the controller controls at least one of the scanning-head, components of the scanning-head, the image acquisition device, and the laser.

39. The method of claim 32, wherein the external optical subsystems each receive separately and at different times the laser beam from the laser scanning head, and each of the external optical subsystems includes a lens to focus the laser beam.

* * * * *